US012659846B2

(12) United States Patent
Faxén et al.

(10) Patent No.: US 12,659,846 B2
(45) Date of Patent: Jun. 16, 2026

(54) NON-COLLOCATED SCELL SELECTION FOR CARRIER AGGREGATION

(71) Applicant: Telefonaktiebolaget LM Ericsson (publ), Stockholm (SE)

(72) Inventors: Linnea Faxén, Linköping (SE); Ping Yu, Ottawa (CA); Geoffrey McHardy, Carp (CA); Ramy Atawia, Kanata (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 277 days.

(21) Appl. No.: 18/252,754

(22) PCT Filed: Nov. 29, 2021

(86) PCT No.: PCT/IB2021/061080
§ 371 (c)(1),
(2) Date: May 12, 2023

(87) PCT Pub. No.: WO2022/113039
PCT Pub. Date: Jun. 2, 2022

(65) Prior Publication Data
US 2024/0007944 A1 Jan. 4, 2024

Related U.S. Application Data

(60) Provisional application No. 63/119,031, filed on Nov. 30, 2020.

(51) Int. Cl.
*H04W 48/20* (2009.01)
*H04L 1/1812* (2023.01)
*H04L 43/0852* (2022.01)

(52) U.S. Cl.
CPC ........... *H04W 48/20* (2013.01); *H04L 1/1812* (2013.01); *H04L 43/0852* (2013.01)

(58) Field of Classification Search
CPC ..... H04W 48/20; H04W 48/18; H04W 48/22; H04L 1/18; H04L 1/1812; H04L 1/1822;
(Continued)

(56) References Cited

U.S. PATENT DOCUMENTS

2015/0280849 A1* 10/2015 Tsai ........................ H04L 23/00
370/328
2015/0359028 A1 12/2015 Iyer et al.
(Continued)

FOREIGN PATENT DOCUMENTS

CN 105190107 A 12/2015
CN 106233657 A 12/2016
(Continued)

OTHER PUBLICATIONS

Invitation to Pay Additional Fees and, Where Applicable, Protest Fee dated Mar. 9, 2022 issued in PCT Application No. PCT/IB2021/061080 filed Nov. 29, 2021, consisting of 13 pages.
(Continued)

*Primary Examiner* — Phong La
(74) *Attorney, Agent, or Firm* — Weisberg I.P. Law, P.A.

(57) ABSTRACT

A method and apparatus are disclosed for non-collocated SCell selection for NR CA. In one embodiment, a network node is configured to estimate a first throughput for the WD at a first candidate secondary cell, the estimated first throughput being based on a measured inter-network node delay between the network node and a first network node supporting the first candidate secondary cell, the network node supporting a primary cell; and determine whether to select the first candidate secondary cell for the WD based on the first estimated throughput. In another embodiment, a network node is configured to determine an average amount of time resources associated with a Hybrid Automatic Repeat reQuest, HARQ, process exhaustion experienced by
(Continued)

BEGIN

ESTIMATE A FIRST THROUGHPUT FOR THE WD AT A FIRST CANDIDATE SECONDARY CELL, THE ESTIMATED FIRST THROUGHPUT BEING BASED AT LEAST IN PART ON A MEASURED INTER-NETWORK NODE DELAY BETWEEN THE NETWORK NODE AND A FIRST NETWORK NODE SUPPORTING THE FIRST CANDIDATE SECONDARY CELL, THE NETWORK NODE SUPPORTING A PRIMARY CELL
S142

DETERMINE WHETHER TO SELECT THE FIRST CANDIDATE SECONDARY CELL FOR THE WD BASED AT LEAST IN PART ON THE FIRST ESTIMATED THROUGHPUT
S144

END

WDs connected to the first candidate secondary cell and primary cells with an inter-network node delay, d; and report the average amount.

18 Claims, 15 Drawing Sheets

(58) Field of Classification Search
    CPC   H04L 1/1825; H04L 43/0852; H04L 43/0823
    See application file for complete search history.

(56) References Cited

U.S. PATENT DOCUMENTS

| | | | |
|---|---|---|---|
| 2022/0353938 A1* | 11/2022 | Siomina | H04L 1/1812 |
| 2023/0370181 A1* | 11/2023 | Rydén | H04B 17/336 |
| 2024/0007944 A1* | 1/2024 | Faxén | H04W 48/20 |

FOREIGN PATENT DOCUMENTS

| | | | | |
|---|---|---|---|---|
| CN | 107071742 A | * | 8/2017 | H04W 72/542 |
| CN | 108012295 A | * | 5/2018 | H04W 36/32 |
| CN | 109565875 A | * | 4/2019 | H04W 72/23 |
| CN | 106878205 B | * | 7/2019 | H04W 56/00 |
| CN | 109963295 A | * | 7/2019 | H04L 43/16 |
| CN | 110198546 A | * | 9/2019 | H04W 24/02 |
| CN | 111194535 A | | 5/2020 | |
| EP | 2987370 A1 | | 2/2016 | |
| JP | 2015207816 A | * | 11/2015 | H04L 27/2613 |
| WO | WO-2016165437 A1 | * | 10/2016 | H04B 7/0413 |
| WO | 2019/106601 A1 | | 6/2019 | |

OTHER PUBLICATIONS

International Search Report and Written Opinion dated May 3, 2022 issued in PCT Application No. PCT/IB2021/061080 filed Nov. 29, 2021, consisting of 17 pages.
3GPP TSG RAN WG1 #102 R1-2006423; Source: Nokia, Nokia Shanghai Bell; Title: Discussion on HARQ stalling avoidance; Agenda item: 8.4.3; Document for: Discussion and Decision; e-Meeting, Aug. 17-29, 2020, consisting of 4 pages.
3GPP TS 38.321 V15.9.0 (Jul. 2020) 3rd Generation Partnership Project; Technical Specification Group Radio Access Network; NR; Medium Access Control (MAC) protocol specification (Release 15), consisting of 78 pages.
Huda Adibah Mohd Ramli et al., A Survey of Component Carrier Selection Algorithms for Carrier Aggregation in Long Term Evolution-Advanced; Proc. of the 4th IEEE International Conference on Smart Instrumentation, Measurement and Applications (ICSIMA), Nov. 28-30, 2017, Putrajaya, Malaysia, consisting of 5 pages.
Chinese Office Action and machine English translation of the Chinese Office Action dated Apr. 10, 2026 for Application No. 202180092197.4, consisting of 6 pages.

* cited by examiner

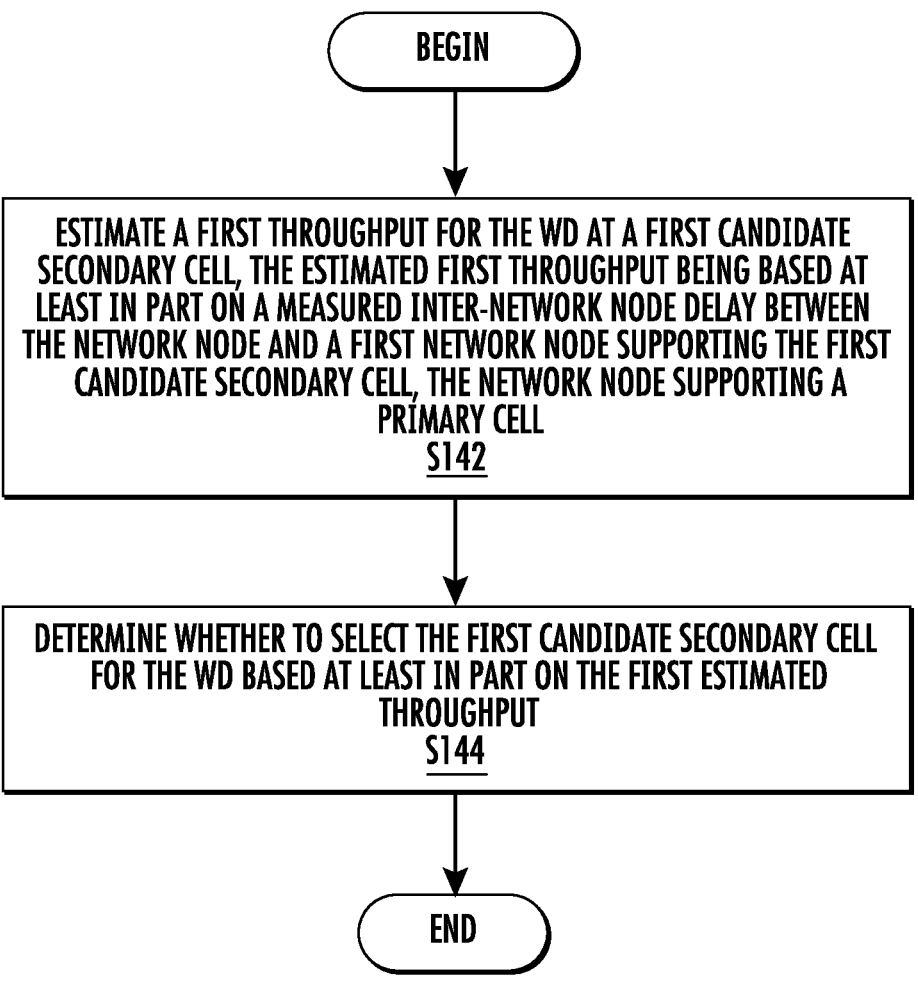

BEGIN

ESTIMATE A FIRST THROUGHPUT FOR THE WD AT A FIRST CANDIDATE SECONDARY CELL, THE ESTIMATED FIRST THROUGHPUT BEING BASED AT LEAST IN PART ON A MEASURED INTER-NETWORK NODE DELAY BETWEEN THE NETWORK NODE AND A FIRST NETWORK NODE SUPPORTING THE FIRST CANDIDATE SECONDARY CELL, THE NETWORK NODE SUPPORTING A PRIMARY CELL
S142

DETERMINE WHETHER TO SELECT THE FIRST CANDIDATE SECONDARY CELL FOR THE WD BASED AT LEAST IN PART ON THE FIRST ESTIMATED THROUGHPUT
S144

END

FIG. 11

| CANDIDATE SCELL | THROUGHPUT /DELAY | LAST TIME CONFIGURED | REWARD |
|---|---|---|---|
| $S_1$ | | | |
| $S_2$ | | | |
| $S_3$ | | | |
| ... | | | |
| $S_n$ | | | |

FIG. 17

NON-COLLOCATED SCELL SELECTION FOR CARRIER AGGREGATION

CROSS-REFERENCE TO RELATED APPLICATIONS

This application is a Submission Under 35 U.S.C. § 371 for U.S. National Stage Patent Application of International Application No.: PCT/IB2021/061080, filed Nov. 29, 2021 entitled "NON-COLLOCATED SCELL SELECTION FOR CARRIER AGGREGATION," which claims priority to U.S. Provisional Application No. 63/119,031, filed Nov. 30, 2020, entitled "NON-COLLOCATED SCELL SELECTION FOR NR CARRIER AGGREGATION," the entireties of both of which are incorporated herein by reference.

FIELD

The present disclosure relates to wireless communications, and in particular, to non-collocated secondary cell (SCell) selection for $3^{rd}$ Generation Partnership Project (3GPP) Carrier Aggregation (CA) in wireless communication networks such as New Radio (NR) networks.

BACKGROUND

3GPP NR (NR is also referred to as 5G) Carrier aggregation (CA) allows users to receive data on multiple frequency blocks (from multiple cells) simultaneously, resulting in increased wireless device (WD, also called user equipment or UE) throughput. The radio network selects secondary cells (SCells) to configure for the WD and considers several aspects, for example what carriers are available in the network and what capabilities the WD supports (which carriers can it aggregate and in what combinations, etc.). The carrier selection problem is well-studied in literature, at least for 3GPP Long Term Evolution (LTE), where there are examples of algorithms considering the channel quality, load, etc., in order to find the best carriers to select for a WD.

Carrier Aggregation is applicable to both LTE and NR. Due to the diversity in channel characteristics of NR bands, cells may be deployed in different locations optimized for their individual non-CA usage. An example of non-collocated gNB s hosting different cells is shown in FIG. 1. Such a deployment may result in creating inter-gNB links with different characteristics that may impact the CA gains from adding such an SCell. For instance, as depicted in FIG. 1, SCell_1 and SCell_2 are both candidates to serve the WD which is connected initially to the special cell (SpCell), which is a primary cell in a master cell group (MCG) or secondary cell group (SCG).

An increased delay of the inter-gNB link (between SpCell and each SCell, Link_1 and Link_2) may have the following impacts on the CA performance:

1) Delayed user data transfer from SpCell to SCell_i over Link_i; and

2) In CA, the Hybrid Automatic Repeat reQuest (HARQ) feedback is transmitted from the WD to the SpCell and then forwarded to the SCell over the inter-gNB links. Delayed HARQ feedback (with long inter-gNB delay) may eventually result in HARQ process exhaustion and outdated link adaptation information. HARQ process exhaustion occurs when all the HARQ processes at the gNB for that particular WD (e.g., UE) are used and the gNB is waiting for the WD HARQ feedback in order to start reusing the HARQ process (and/or HARQ process identifier (ID)) again for transmitting new WD data.

With respect to the above, the delay depends on many factors such as the distance between gNBs and the quality of the backhaul (e.g., routers and hubs on this link).

Existing arrangements for selecting SCells do not consider the impact of how long an inter-node latency affects throughput.

SUMMARY

Some embodiments advantageously provide methods, systems, and apparatuses for non-collocated secondary cell (SCell) selection for $3^{rd}$ Generation Partnership Project (3GPP) New Radio (NR, also called $5^{th}$ Generation or 5G) Carrier Aggregation (CA).

In one embodiment, a network node is configured to estimate a throughput for the WD at a candidate secondary cell, the estimated throughput based at least in part on a measured inter-network node delay between the network node and another network node, the network node supporting (and/or hosting) a special cell and the another network node supporting (and/or hosting) the candidate secondary cell; and determine whether to select the candidate secondary cell for the WD based at least in part on the estimated throughput. It is noted that the disclosure refers to "inter-network node" delay. An example of an "inter-network node" delay within the context of 3GPP may be an "inter-gNB" delay. Thus, discussion of "inter-network node" delay herein should be understood to include "inter-gNB delay" within the context of a 3GPP New Radio implementation.

In another embodiment, a network node is configured to determine a time duration associated with Hybrid Automatic Repeat reQuest (HARQ) process exhaustion at an inter-network node delay; and report the time duration to another network node, the another network node supporting (and/or hosting) a special cell and the network node supporting (and/or hosting) a candidate secondary cell.

According to an aspect, a method implemented in a network node configured to communicate with a wireless device, WD, is provided. The method comprises estimating a first throughput for the WD at a first candidate secondary cell, the estimated first throughput being based at least in part on a measured inter-network node delay between the network node and a first network node supporting the first candidate secondary cell, the network node supporting a primary cell; and determining whether to select the first candidate secondary cell for the WD based at least in part on the first estimated throughput.

In some embodiments, the method further comprises determining an amount of Hybrid Automatic Repeat reQuest, HARQ, process reuse associated with the first candidate secondary cell for the WD, the estimated throughput based further on the determined amount of HARQ process reuse. In some embodiments, the method further comprises estimating an amount of a throughput degradation associated with a HARQ process exhaustion at the first candidate secondary cell for the WD, the first estimated throughput being further based on the estimated amount of the throughput degradation. In some embodiments, the estimating the first throughput for the WD further comprises assuming a same bandwidth, a same radio condition and a same load for the first candidate secondary cell and a second candidate secondary cell on which a second throughput for the WD is estimated.

In some embodiments, wherein the estimated amount of the throughput degradation associated with the HARQ process exhaustion at the first candidate secondary cell for the WD is based on a configuration received from the first network node, the information indicating a maximum number of HARQ processes associated with the first candidate secondary cell for the WD; and wherein the estimating the first throughput for the WD further comprises assuming different numerologies for the first candidate secondary cell and a second candidate secondary cell on which a second throughput for the WD is estimated.

In some embodiments, the method further comprises receiving feedback from the first network node supporting the first candidate secondary cell, the feedback indicating an average amount of time resources associated with a Hybrid Automatic Repeat reQuest, HARQ, process exhaustion experienced by WDs connected to the first candidate secondary cell and primary cells with an inter-network node delay, d, and the determining whether to select the first candidate secondary cell for the WD being based further on the received feedback.

In some embodiments, the method further comprises using a machine learning model comprising feedback from network nodes supporting candidate secondary cells as an input; and configuring, de-configuring and activating a plurality of candidate secondary cells having different inter-network node delays according to the machine learning model, and the determining whether to select the first candidate secondary cell for the WD being based further on an output of the machine learning model.

In some embodiments, the method further comprises estimating multiple throughputs for the WD at multiple candidate secondary cells, the multiple estimated throughputs being based at least in part on a measured inter-network node delay between the network node and multiple network nodes supporting the multiple candidate secondary cells; selecting at least one of the multiple candidate secondary cells for the WD based on a comparison between the multiple estimated throughputs; and configuring the WD with the selected at least one of the multiple candidate secondary cells. In some embodiments, the method further comprises using a predicted throughput, Tp, based on inter-network node delay as an input to selecting the at least one of the multiple candidate secondary cells. In some embodiments, the method further comprises using a machine learning model to select the at least one of the multiple candidate secondary cells for the WD, the machine learning model comprising, as an input, at least one of: the measured inter-network node delay; an amount of Hybrid Automatic Repeat reQuest, HARQ, process reuse; an estimated amount of a throughput degradation associated with a HARQ process exhaustion; and a feedback indicating an average amount of time resources associated with the HARQ process exhaustion for an inter-network node delay, d.

According to another aspect, a network node configured to communicate with a wireless device, WD, is provided. The network node comprises processing circuitry. The processing circuitry is configured to estimate a first throughput for the WD at a first candidate secondary cell, the estimated first throughput being based at least in part on a measured inter-network node delay between the network node and a first network node supporting the first candidate secondary cell, the network node supporting a primary cell; and determine whether to select the first candidate secondary cell for the WD based at least in part on the first estimated throughput.

In some embodiments, the processing circuitry is further configured to determine an amount of Hybrid Automatic Repeat reQuest, HARQ, process reuse associated with the first candidate secondary cell for the WD, the estimated throughput based further on the determined amount of HARQ process reuse. In some embodiments, the processing circuitry is further configured to estimate an amount of a throughput degradation associated with a HARQ process exhaustion at the first candidate secondary cell for the WD, the first estimated throughput being further based on the estimated amount of the throughput degradation. In some embodiments, the processing circuitry is configured to estimate the first throughput for the WD by being configured to assume a same bandwidth, a same radio condition and a same load for the first candidate secondary cell and a second candidate secondary cell on which a second throughput for the WD is estimated.

In some embodiments, the estimated amount of the throughput degradation associated with the HARQ process exhaustion at the first candidate secondary cell for the WD is based on a configuration received from the first network node, the information indicating a maximum number of HARQ processes associated with the first candidate secondary cell for the WD; and the processing circuitry is configured to estimate the first throughput for the WD by being configured to assume different numerologies for the first candidate secondary cell and a second candidate secondary cell on which a second throughput for the WD is estimated.

In some embodiments, the processing circuitry is further configured to receive feedback from the first network node supporting the first candidate secondary cell, the feedback indicating an average amount of time resources associated with HARQ process exhaustion experienced by WDs connected to the first candidate secondary cell and primary cells with an inter-network node delay, d, and the determination of whether to select the first candidate secondary cell for the WD is based further on the received feedback.

In some embodiments, the processing circuitry is further configured to use a machine learning model comprising feedback from network nodes supporting candidate secondary cells as an input; and configure, de-configure and activate a plurality of candidate secondary cells having different inter-network node delays according to the machine learning model, and the determination of whether to select the first candidate secondary cell for the WD is based further on an output of the machine learning model. In some embodiments, the processing circuitry is further configured to estimate multiple throughputs for the WD at multiple candidate secondary cells, the multiple estimated throughputs being based at least in part on a measured inter-network node delay between the network node and multiple network nodes supporting the multiple candidate secondary cells; select at least one of the multiple candidate secondary cells for the WD based on a comparison between the multiple estimated throughputs; and configure the WD with the selected at least one of the multiple candidate secondary cells.

In some embodiments, the processing circuitry is further configured to use a predicted throughput, Tp, based on inter-network node delay as an input to selecting the at least one of the multiple candidate secondary cells. In some embodiments, the first candidate secondary cell is non-collocated with the primary cell. In some embodiments, the processing circuitry is further configured to use a machine learning model to select the at least one of the multiple candidate secondary cells for the WD, the machine learning model comprising, as an input, at least one of: the measured inter-network node delay; an amount of Hybrid Automatic Repeat reQuest, HARQ, process reuse; an estimated amount of a throughput degradation associated with a HARQ process exhaustion; and a feedback indicating an average amount of time resources associated with the HARQ process exhaustion for an inter-network node delay, d.

According to another aspect, a method implemented in a network node configured to communicate with a wireless device, WD, is provided. The method comprises determining an average amount of time resources associated with a Hybrid Automatic Repeat reQuest, HARQ, process exhaustion experienced by WDs connected to the first candidate secondary cell and primary cells with an inter-network node delay, d; and reporting a feedback indicating the average amount to another network node, the another network node supporting a primary cell and the network node supporting a candidate secondary cell.

In some embodiments, the method comprises communicating with the WD in the candidate secondary cell, the candidate secondary cell being selected for carrier aggregation for the WD based at least in part on an estimated WD throughput for the candidate secondary cell, the estimated WD throughput being based at least in part on at least one of: a measured inter-network node delay; an amount of Hybrid Automatic Repeat reQuest, HARQ, process reuse; an estimated amount of a throughput degradation associated with a HARQ process exhaustion; a machine learning model; and the reported feedback.

According to another aspect, a network node configured to communicate with a wireless device, WD, is provided. The network node comprises processing circuitry. The processing circuitry is configured to determine an average amount of time resources associated with a Hybrid Automatic Repeat reQuest, HARQ, process exhaustion experienced by WDs connected to the first candidate secondary cell and primary cells with an inter-network node delay, d; and report a feedback indicating the average amount to another network node, the another network node supporting a primary cell and the network node supporting a candidate secondary cell.

In some embodiments, the processing circuitry is further configured to cause the network node to communicate with the WD in the candidate secondary cell, the candidate secondary cell being selected for carrier aggregation for the WD based at least in part on an estimated WD throughput for the candidate secondary cell, the estimated WD throughput being based at least in part on at least one of: a measured inter-network node delay; an amount of Hybrid Automatic Repeat Request, HARQ, process reuse; an estimated amount of a throughput degradation associated with a HARQ process exhaustion; a machine learning model; and the reported feedback.

BRIEF DESCRIPTION OF THE DRAWINGS

A more complete understanding of the present embodiments, and the attendant advantages and features thereof, may be more readily understood by reference to the following detailed description when considered in conjunction with the accompanying drawings wherein:

FIG. 11 is a flowchart of an exemplary process in a network node according to some embodiments of the present disclosure;

FIG. 17 illustrates an example of knowledge base according to some embodiments of the present disclosure.

DETAILED DESCRIPTION

Existing solutions do not consider the latency of the inter-network node, e.g., inter-gNB, link during SCell Selection. A problem with this is that the network may select an SCell with more bandwidth which should provide a higher throughput, but due to the long latency this SCell in fact provides less throughput.

Figure 2:
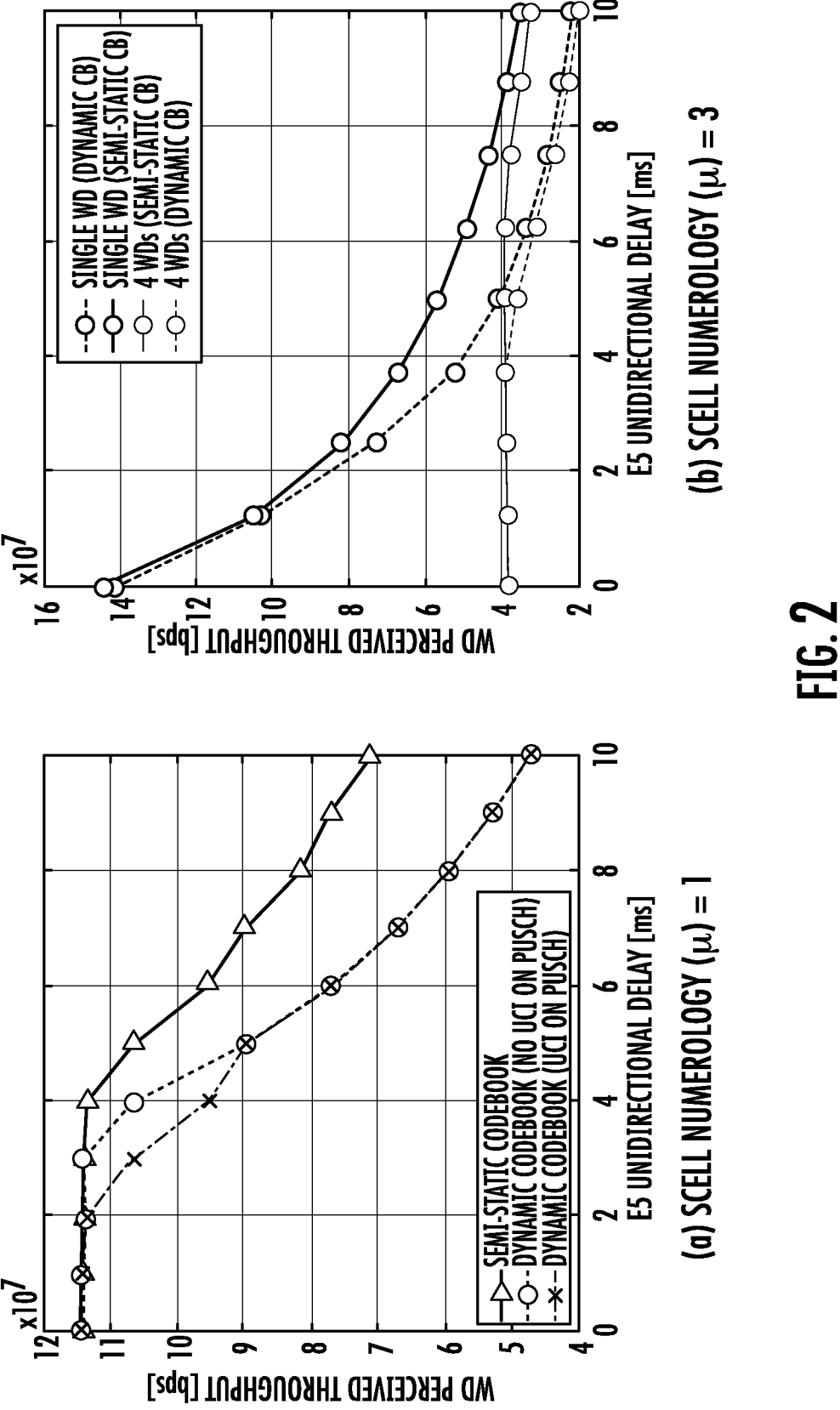
FIG. 2 illustrates an example of simulation of inter-gNB link delay impact on CA user throughput for SCells with different numerologies (for e.g., comparing throughputs and RTT with different HARQ-ACK codebooks, where the comparisons are conducted under variant numerologies, instead of comparing the throughput between different numerologies)

Even if the latency of the inter-node link was considered, simply using the latency value may not be sufficient. For example, a cell with a large bandwidth but increased latency may still be able to provide more throughput to the WD than a cell with very short latency, but less bandwidth. In addition, the gNB implementation, such as the type of HARQ codebook may also affect the achievable throughput, as seen in FIG. 2.

Some embodiments of the present disclosure provide methods to estimate the expected user experience (e.g., throughput) of different SCell candidates considering the latency between the network node (NN) where the special cell (SpCell) is located and the network node(s) (NNs) where the SCell candidates(s) are located. With a more accurate throughput estimate, a better set of SCells can be chosen for the WD, and the throughput for the WD may increase.

Some embodiments of the present disclosure may provide a more accurate estimate of potential WD throughput at each SCell prior to SCell configuration/activation, as compared to existing arrangements.

Some embodiments of the present disclosure may avoid adding SCells with large inter-network node, e.g., inter-gNB delay which may decrease the CA gains especially when there are other SCells with shorter inter-network node delay and less loaded.

Some embodiments of the present disclosure may increase usage of SCell candidates with long inter-network node delay, when they do in fact provide increased through-put due to large bandwidth or less load (this method may be considered more sophisticated than to exclude all candidates with a latency longer than a certain threshold).

Before describing in detail exemplary embodiments, it is noted that the embodiments reside primarily in combinations of apparatus components and processing steps related to non-collocated SCell selection for NR CA. Accordingly, components have been represented where appropriate by conventional symbols in the drawings, showing only those specific details that are pertinent to understanding the embodiments so as not to obscure the disclosure with details that may be readily apparent to those of ordinary skill in the art having the benefit of the description herein. Like num-bers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It may be further under-stood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accom-plished by physical contact, induction, electromagnetic radiation, radio signaling, infrared signaling or optical sig-naling, for example. One having ordinary skill in the art may appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, trans-mission nodes, Remote Radio Unit (RRU) Remote Radio Head (RRH), a core network node (e.g., mobile management entity (MME), self-organizing network (SON) node, a coor-dinating node, positioning node, MDT node, etc.), an exter-nal node (e.g., 3rd party node, a node external to the current network), nodes in distributed antenna system (DAS), a spectrum access system (SAS) node, an element manage-ment system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchange-ably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Some embodiments may describe steps performed by or at a particular cell (e.g., SpCell, SCell). However, it should be understood that the steps are performed by a NN sup-porting the particular cell.

Figure 1:
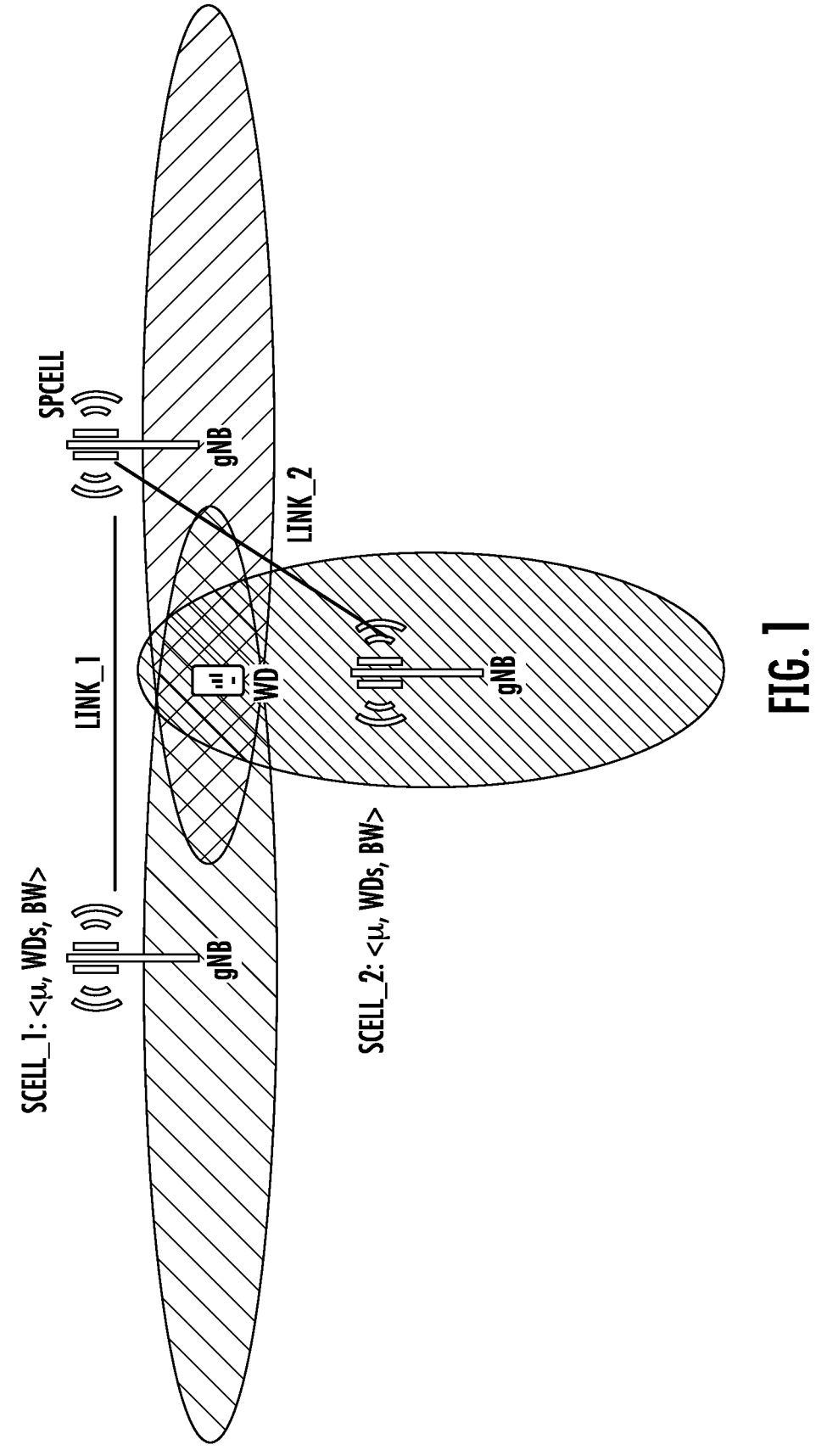
FIG. 1 illustrates an example of non-collocated gNB for SpCell and SCell.

In some embodiments, non-collocated SCells are SCells that are not located at the same NN as the NN supporting (and/or hosting) a corresponding SpCell, see FIG. 1 as an example of a general topology.

The term "signaling" used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "radio measurement" used herein may refer to any measurement performed on radio signals. Radio mea-surements can be absolute or relative. Radio measurement may be called as signal level which may be signal quality and/or signal strength. Radio measurements can be e.g. intra-frequency, inter-frequency, inter-RAT measurements, CA measurements, etc. Radio measurements can be unidirectional (e.g., DL or UL) or bidirectional (e.g., Round Trip Time (RTT), Receive-Transmit (Rx-Tx), etc.). Some examples of radio measurements: timing measurements (e.g., Time of Arrival (TOA), timing advance, RTT, Reference Signal Time Difference (RSTD), Rx-Tx, propagation delay, etc.), angle measurements (e.g., angle of arrival), power-based measurements (e.g., received signal power, Reference Signals Received Power (RSRP), received signal quality, Reference Signals Received Quality (RSRQ), Signal-to-interference-plus-noise Ratio (SINR), Signal Noise Ratio (SNR), interference power, total interference plus noise, Received Signal Strength Indicator (RSSI), noise power, etc.), cell detection or cell identification, radio link monitoring (RLM), system information (SI) reading, etc. The inter-frequency and inter-RAT measurements may be carried out by the WD in measurement gaps unless the WD is capable of doing such measurement without gaps. For example, measurements on configured SCells may not require measurement gaps since these are considered serving cells.

The term "numerology" herein may comprise, e.g., any one or more of: frame duration, subframe or TTI duration, slot or minislot duration, symbol duration and the number of symbols per slot and subframe, subcarrier spacing, sampling frequency, Fast Fourier Transform (FFT) size, number of subcarriers per resource block (RB) and RB bandwidth, number of RB s within a bandwidth, symbols per subframe, cyclic prefix (CP) length, etc. The numerology determines the grid of resource elements (REs) in time and/or frequency domain.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns representing the information.

The term time resource used herein may correspond to any type of physical resource or radio resource expressed in terms of length of time. Examples of time resources are: symbol, slot, sub-slot, subframe, radio frame, TTI, interleaving time, etc. As used herein, in some embodiments, the terms "slot," and "time resource" are used interchangeably.

A cell may be generally a communication cell, e.g., of a cellular or mobile communication network, provided by a node. A serving cell may be a cell on or via which a network node (the node providing or associated to the cell, e.g., base station or gNodeB) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC_connected or RRC_idle state, e.g., in case the node and/or user equipment and/or network follow the NR or LTE-standard. One or more carriers (e.g., uplink and/or downlink carrier/s and/or a carrier for both uplink and downlink) may be associated to a cell.

In some embodiments, a "set" as used herein may be a set of 1 or more elements in the set.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It may be further understood that terms used herein should be interpreted as having a meaning that is consistent with their meaning in the context of this specification and the relevant art and may not be interpreted in an idealized or overly formal sense unless expressly so defined herein.

Figure 3:
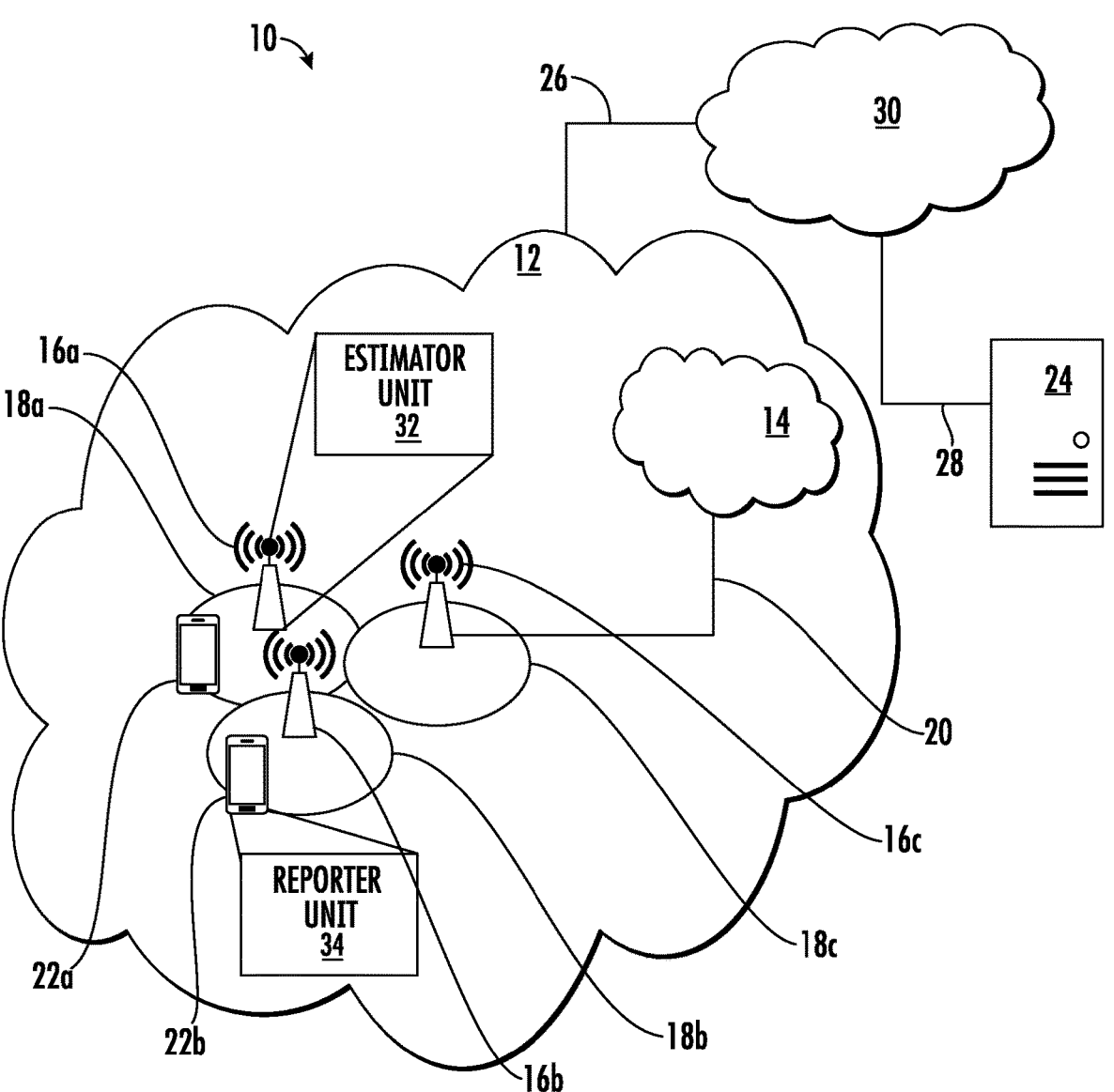
FIG. 3 is a schematic diagram of an exemplary network architecture illustrating a communication system connected via an intermediate network to a host computer according to the principles in the present disclosure.

Some embodiments provide non-collocated SCell selection for NR CA. Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NB s, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16 is configured to include an estimator unit 32 which is configured to estimate a throughput for the WD at a candidate secondary cell, the estimated throughput based at least in part on a measured inter-network node delay between the network node and another network node, the network node supporting a special cell and the another network node supporting the candidate secondary cell; and determine whether to select the candidate secondary cell for the WD based at least in part on the estimated throughput. A network node 16 is configured to include a reporter unit 34 which is configured to determine a time duration associated with Hybrid Automatic Repeat reQuest (HARQ) process exhaustion at an inter-network node delay; and report the time duration to another network node, the another network node supporting a special cell and the network node supporting a candidate secondary cell Example implementations, in accordance with an embodiment, of the WD 22, network node 16 and host computer 24 discussed in the preceding paragraphs may now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 (e.g., NN supporting special cell) may include estimator unit 32 configured to perform network node methods discussed herein, such as the methods discussed with reference to FIG. 9 as well as other figures.

In some embodiments, the processing circuitry 68 of the network node 16 (e.g., NN supporting a candidate secondary cell) may include a reporter unit 34 configured to perform network node 16 methods discussed herein, such as the methods discussed with reference to FIG. 10 as well as other figures.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

Figure 4:
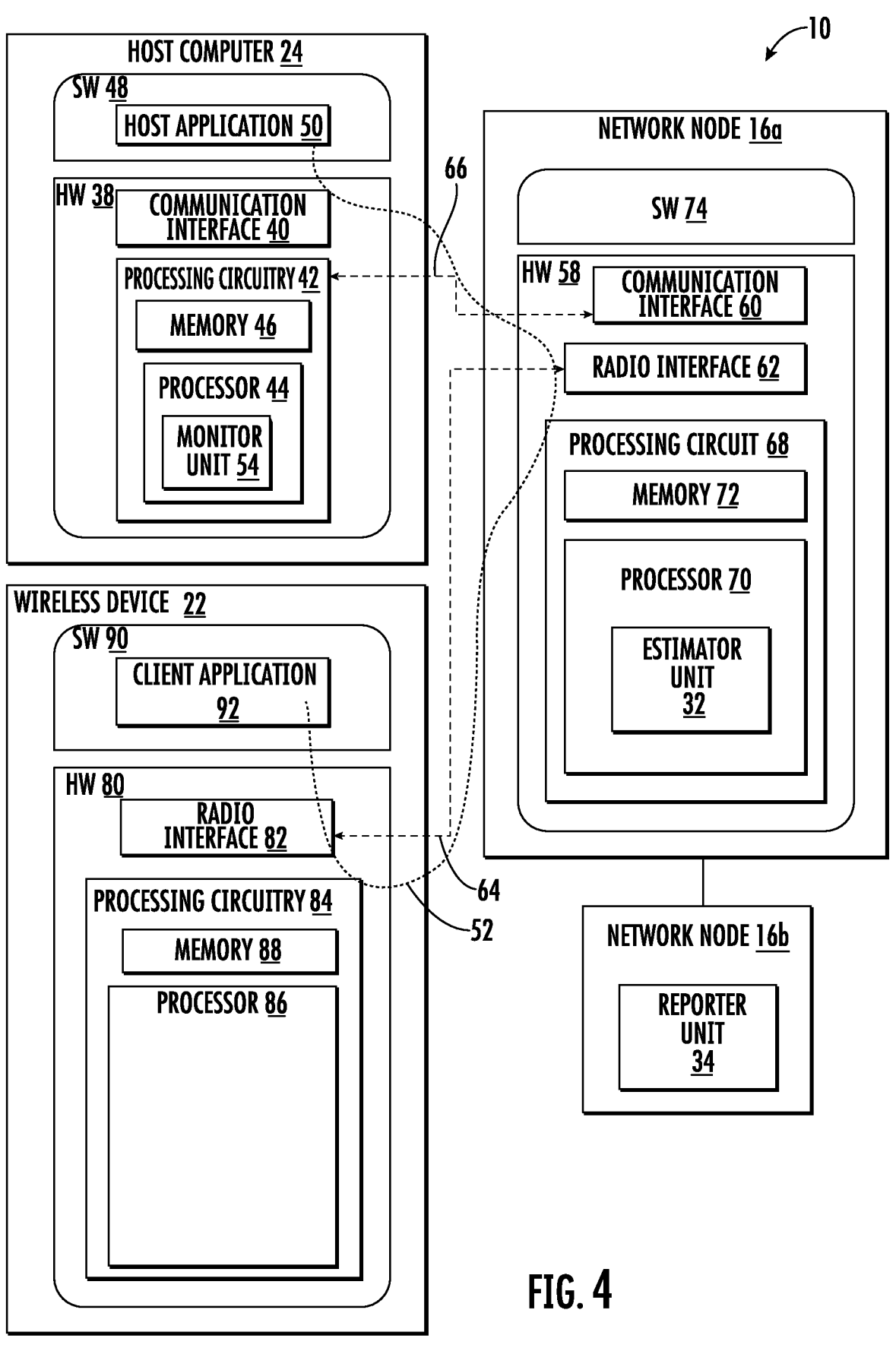
FIG. 4 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as estimator unit 32, and reporter unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 5, 6:
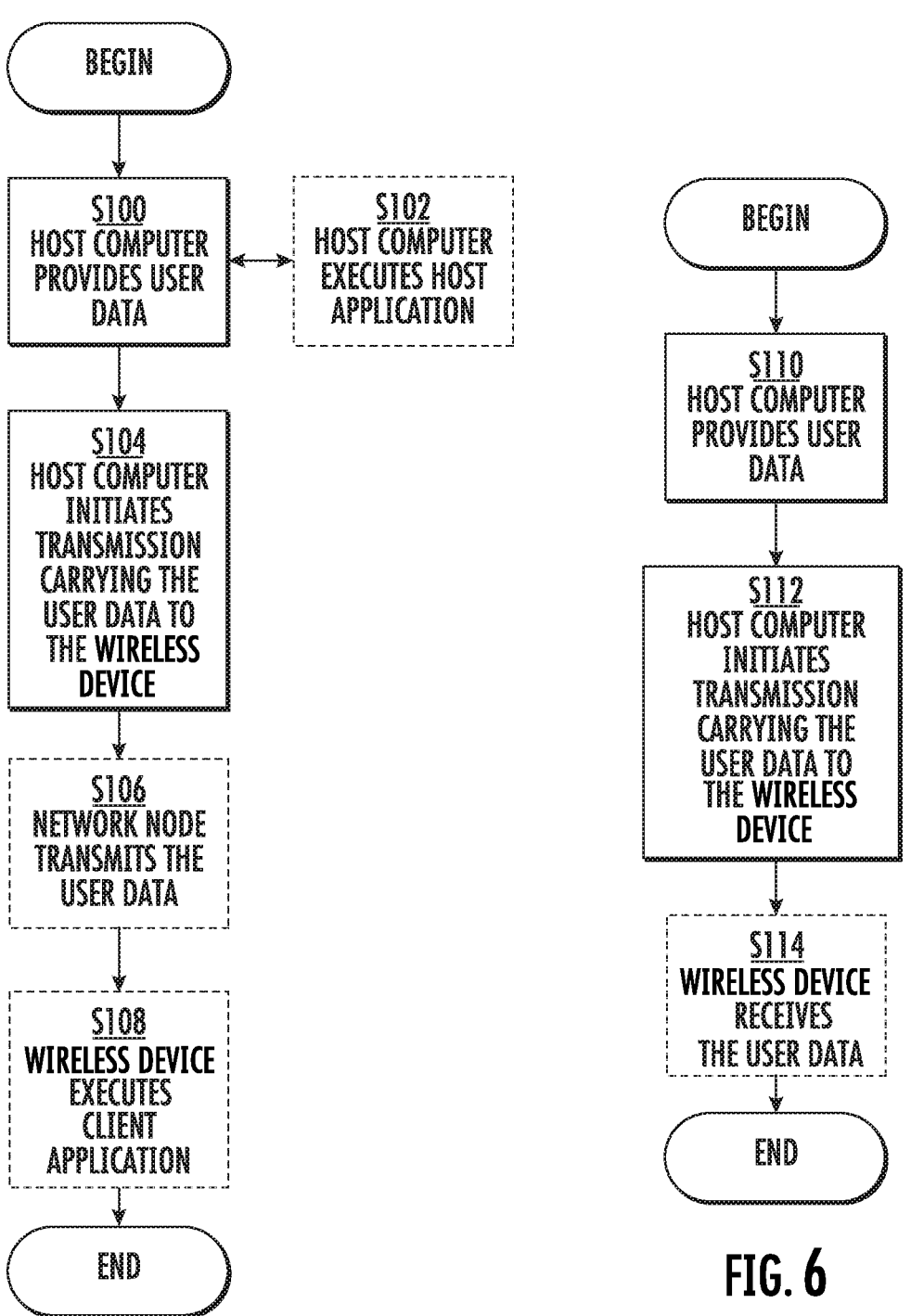
FIG. 5 is a flowchart illustrating exemplary methods implemented in a communication system including a host computer, a network node and a wireless device for executing a client application at a wireless device according to some embodiments of the present disclosure.
FIG. 6 is a flowchart illustrating exemplary methods implemented in a communication system including a host computer, a network node and a wireless device for receiving user data at a wireless device according to some embodiments of the present disclosure.

FIG. 5 is a flowchart illustrating an exemplary method implemented in a communication system, such as, for example, the communication system of FIGS. 3 and 4, in accordance with one embodiment. The communication system may include a host computer 24, a network node 16 and a WD 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 6 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 7, 8:
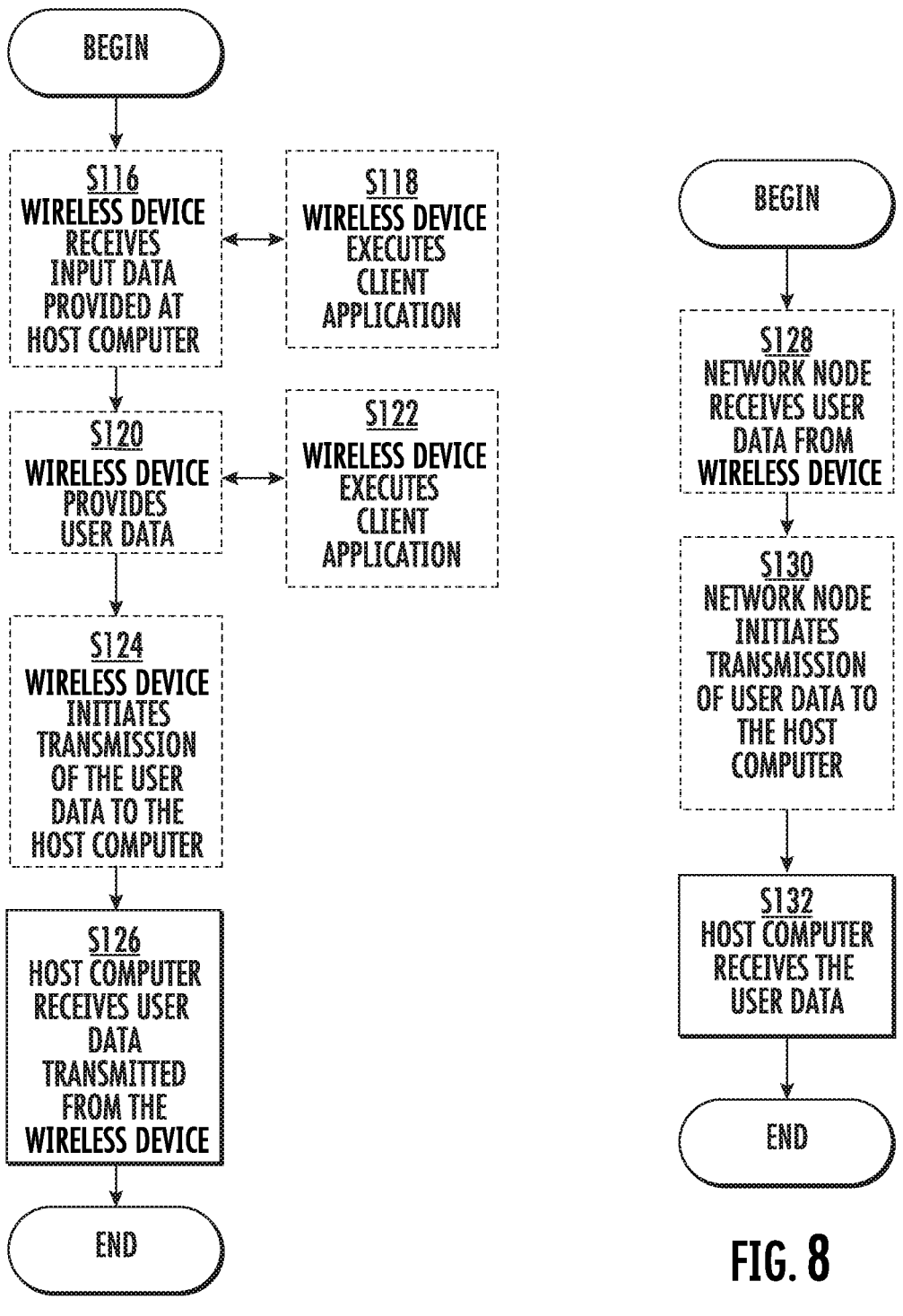
FIG. 7 is a flowchart illustrating exemplary methods implemented in a communication system including a host computer, a network node and a wireless device for receiving user data from the wireless device at a host computer according to some embodiments of the present disclosure.
FIG. 8 is a flowchart illustrating exemplary methods implemented in a communication system including a host computer, a network node and a wireless device for receiving user data at a host computer according to some embodiments of the present disclosure.

FIG. 7 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 8 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 9:
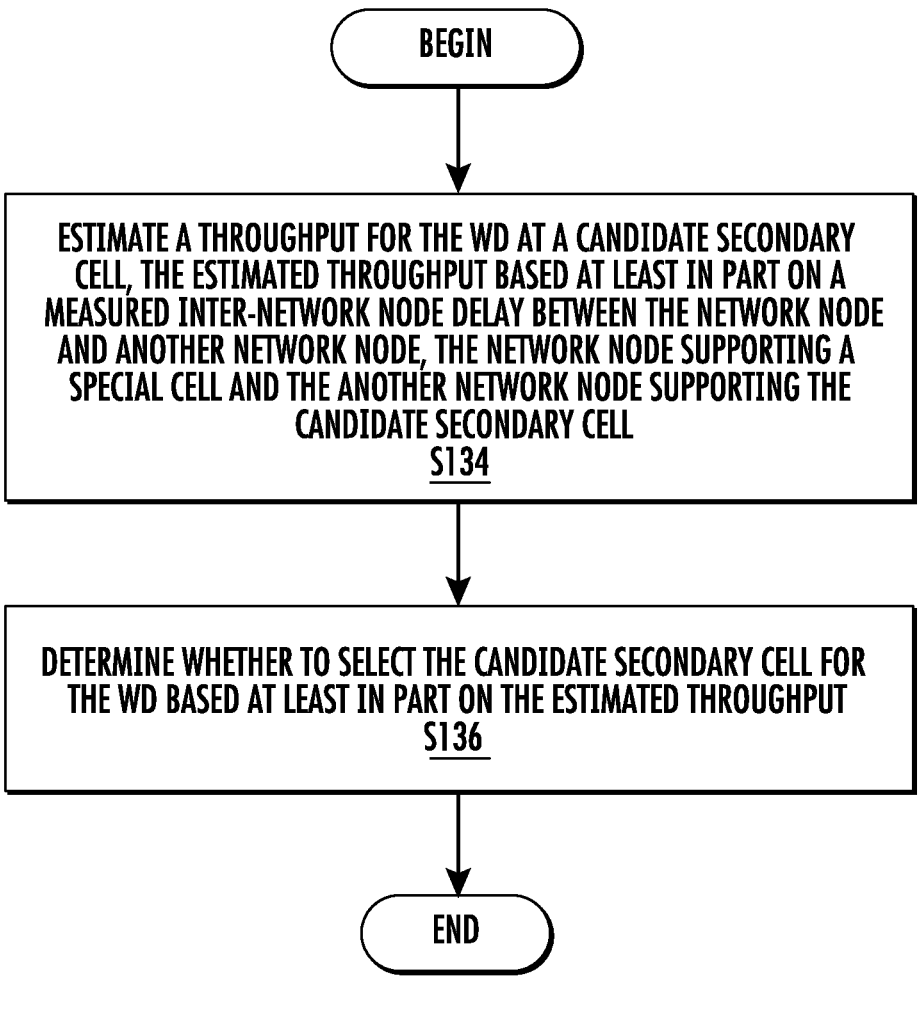
FIG. 9 is a flowchart of an exemplary process in a network node according to some embodiments of the present disclosure.

FIG. 9 is a flowchart of an exemplary process in a network node 16 according to some embodiments of the present disclosure. One or more Blocks and/or functions and/or methods performed by the network node 16 may be performed by one or more elements of network node 16 such as by estimator unit 32 in processing circuitry 68, processor 70, radio interface 62, etc. according to the example method. The example method includes estimating (Block S134), such as via estimator unit 32, processing circuitry 68, processor 70, communication interface 60 and/or radio interface 62, a throughput for the WD at a candidate secondary cell, the estimated throughput based at least in part on a measured inter-network node delay between the network node and another network node, the network node supporting a special cell and the another network node supporting the candidate secondary cell. The method includes determining (Block S136), such as via estimator unit 32, processing circuitry 68, processor 70, communication interface 60 and/or radio interface 62, whether to select the candidate secondary cell for the WD based at least in part on the estimated throughput.

In some embodiments, one or more of: the candidate secondary cell is non-collocated with the special cell; and the estimated throughput is based at least in part on at least one of: a Hybrid Automatic Repeat reQuest (HARQ) codebook used for the candidate secondary cell; an amount of HARQ process reuse used for the candidate secondary cell; feedback from the candidate secondary cell, the feedback indicating an amount of time resources associated with HARQ process exhaustion for an inter-network node delay, d; a numerology used by the secondary cell; and a machine learning algorithm. In some embodiments, the method further includes measuring, such as via estimator unit 32, processing circuitry 68, processor 70, communication interface 60 and/or radio interface 62, the inter-network node delay between the network node and another network node.

Figure 10:
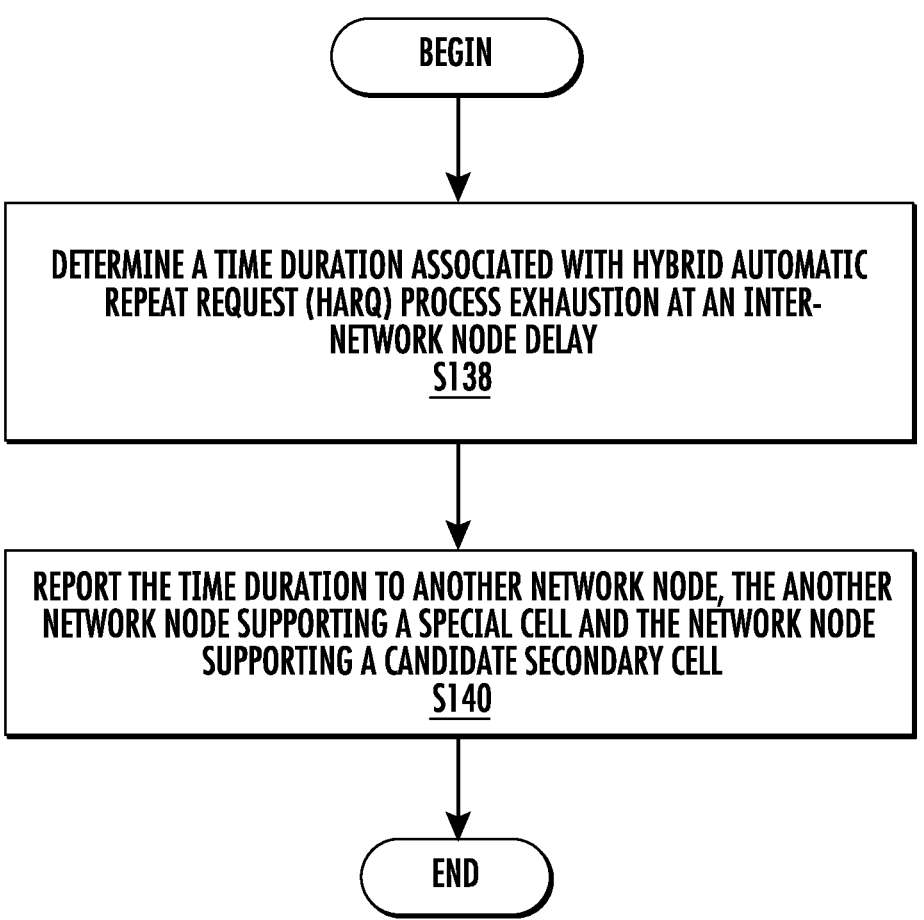
FIG. 10 is a flowchart of an exemplary process in a network node according to some embodiments of the present disclosure.

FIG. 10 is a flowchart of an exemplary process in a network node 16 according to some embodiments of the present disclosure. One or more Blocks and/or functions and/or methods performed by the network node 16 may be performed by one or more elements of network node 16 such as by reporter unit 34 in processing circuitry 68, processor 70, radio interface 62, etc. according to the example method. The example method includes determining (Block S138), such as via reporter unit 34, processing circuitry 68, processor 70, communication interface 60 and/or radio interface 62, a time duration associated with Hybrid Automatic Repeat reQuest (HARQ) process exhaustion at an inter-network node delay. The method includes reporting (Block S140), such as via reporter unit 34, processing circuitry 68, processor 70, communication interface 60 and/or radio interface 62, the time duration to another network node, the another network node supporting a special cell and the network node supporting a candidate secondary cell.

In some embodiments, one or more of: the time duration is based at least in part on a number of slots at which this WD was not able to be scheduled due to at least one of: unavailability of HARQ processes and other WDs being scheduled; the candidate secondary cell is non-collocated with the special cell; and the candidate secondary cell being selected for carrier aggregation for the WD based at least in part on an estimated WD throughput, the estimated WD throughput being based at least in part on the reported amount.

FIG. 11 is a flowchart of an exemplary process in a network node 16 according to some embodiments of the present disclosure. One or more Blocks and/or functions and/or methods performed by the network node 16 may be performed by one or more elements of network node 16 such as by estimator unit 32 in processing circuitry 68, processor 70, communication interface 60, radio interface 62, etc. according to the example method. The network node 16 is configured to, such as by estimator unit 32 in processing circuitry 68, processor 70, communication interface 60 and/or radio interface 62, estimate (Block S142) a first throughput for the WD at a first candidate secondary cell, the estimated first throughput being based at least in part on a measured inter-network node delay between the network node and a first network node supporting the first candidate secondary cell, the network node supporting a primary cell. The network node 16 is configured to, such as by estimator unit 32 in processing circuitry 68, processor 70, communication interface 60 and/or radio interface 62, determine (Block S144) whether to select the first candidate secondary cell for the WD based at least in part on the first estimated throughput.

In some embodiments, the network node 16 is configured to, such as by estimator unit 32 in processing circuitry 68, processor 70, communication interface 60 and/or radio interface 62, determine an amount of Hybrid Automatic Repeat reQuest, HARQ, process reuse associated with the first candidate secondary cell for the WD, the estimated throughput based further on the determined amount of HARQ process reuse. In some embodiments, the network node 16 is configured to, such as by estimator unit 32 in processing circuitry 68, processor 70, communication interface 60 and/or radio interface 62, estimate an amount of a throughput degradation associated with a HARQ process exhaustion at the first candidate secondary cell for the WD, the first estimated throughput being further based on the estimated amount of the throughput degradation.

In some embodiments, the network node 16 is configured to, such as by estimator unit 32 in processing circuitry 68, processor 70, communication interface 60 and/or radio interface 62, estimate the first throughput for the WD by being configured to assume a same bandwidth, a same radio condition and a same load for the first candidate secondary cell and a second candidate secondary cell on which a second throughput for the WD is estimated. In some embodiments, the estimated amount of the throughput degradation associated with the HARQ process exhaustion at the first candidate secondary cell for the WD is based on information received from the first network node, the information indicating a maximum number of HARQ processes associated with the first candidate secondary cell for the WD.

In some embodiments, the network node 16 is configured to, such as by estimator unit 32 in processing circuitry 68, processor 70, communication interface 60 and/or radio interface 62, estimate the first throughput for the WD by being configured to assume different numerologies for the first candidate secondary cell and a second candidate secondary cell on which a second throughput for the WD is estimated. In some embodiments, the network node 16 is configured to, such as by estimator unit 32 in processing circuitry 68, processor 70, communication interface 60 and/or radio interface 62, receive feedback from the first network node supporting the first candidate secondary cell, the feedback indicating an average amount of time resources associated with HARQ process exhaustion experienced by WDs connected to the first candidate secondary cell and primary cells with an inter-network node delay, d, and the determination of whether to select the first candidate secondary cell for the WD is based further on the received feedback.

In some embodiments, the network node 16 is configured to, such as by estimator unit 32 in processing circuitry 68, processor 70, communication interface 60 and/or radio interface 62, use a machine learning model comprising feedback from network nodes supporting candidate secondary cells as an input; and configure, de-configure and activate a plurality of candidate secondary cells having different inter-network node delays according to the machine learning model, and the determination of whether to select the first candidate secondary cell for the WD is based further on an output of the machine learning model.

In some embodiments, the network node 16 is configured to, such as by estimator unit 32 in processing circuitry 68, processor 70, communication interface 60 and/or radio interface 62, estimate multiple throughputs for the WD at multiple candidate secondary cells, the multiple estimated throughputs being based at least in part on a measured inter-network node delay between the network node and multiple network nodes supporting the multiple candidate secondary cells; select at least one of the multiple candidate secondary cells for the WD based on a comparison between the multiple estimated throughputs; and configure the WD with the selected at least one of the multiple candidate secondary cells. In some embodiments, the network node 16 is configured to, such as by estimator unit 32 in processing circuitry 68, processor 70, communication interface 60 and/or radio interface 62, use a predicted throughput, Tp, based on inter-network node delay as an input to selecting the at least one of the multiple candidate secondary cells. In some embodiments, the first candidate secondary cell is non-collocated with the primary cell.

In some embodiments, the network node 16 is configured to, such as by estimator unit 32 in processing circuitry 68, processor 70, communication interface 60 and/or radio interface 62, use a machine learning model to select the one of the first and second candidate secondary cells for the WD, the machine learning model comprising, as an input, at least one of: the measured inter-network node delay; an amount of Hybrid Automatic Repeat reQuest, HARQ, process reuse; an estimated amount of a throughput degradation associated with a HARQ process exhaustion; and a feedback indicating an average amount of time resources associated with the HARQ process exhaustion for an inter-network node delay, d. In some embodiments, the first candidate secondary cell is non-collocated with the primary cell.

Figure 12:
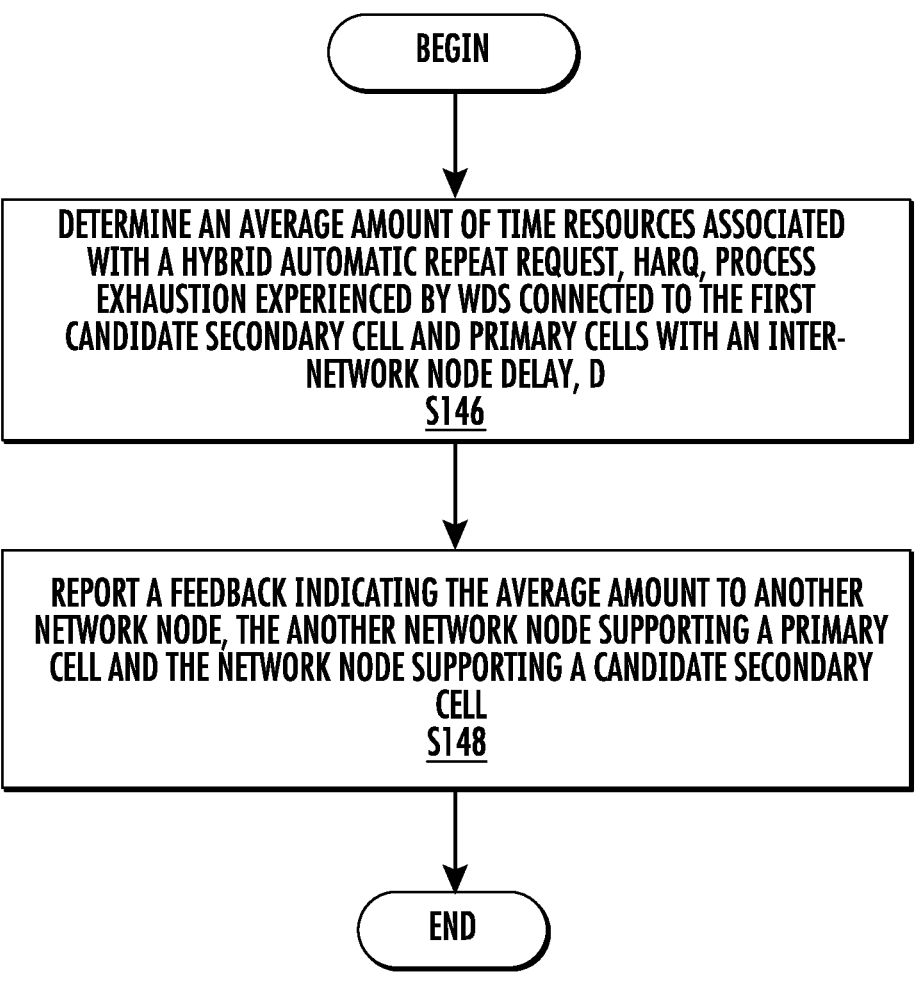
FIG. 12 is a flowchart of an exemplary process in a network node according to some embodiments of the present disclosure.

FIG. 12 is a flowchart of an exemplary process in a network node 16 according to some embodiments of the present disclosure. One or more Blocks and/or functions and/or methods performed by the network node 16 may be performed by one or more elements of network node 16 such as by reporter unit 34 in processing circuitry 68, processor 70, radio interface 62, etc. according to the example method. The network node 16 is configured to, such as by reporter unit 34 in processing circuitry 68, processor 70, communication interface 60 and/or radio interface 62, determine (Block S146) an average amount of time resources associated with a Hybrid Automatic Repeat reQuest, HARQ, process exhaustion experienced by WDs connected to the first candidate secondary cell and primary cells with an inter-network node delay, d. The network node 16 is configured to, such as by reporter unit 34 in processing circuitry 68, processor 70, communication interface 60 and/or radio interface 62, report (Block S148) a feedback indicating the average amount to another network node, the another network node supporting a primary cell and the network node supporting a candidate secondary cell.

In some embodiments, the network node 16 is configured to, such as by reporter unit 34 in processing circuitry 68, processor 70, communication interface 60 and/or radio interface 62, communicate with the WD in the candidate secondary cell, the candidate secondary cell being selected for carrier aggregation for the WD based at least in part on an estimated WD throughput for the candidate secondary cell, the estimated WD throughput being based at least in part on at least one of: a measured inter-network node delay; an amount of Hybrid Automatic Repeat Request, HARQ, process reuse; an estimated amount of a throughput degradation associated with a HARQ process exhaustion; a machine learning model; and the reported feedback.

Having described the general process flow of arrangements of the disclosure and having provided examples of hardware and software arrangements for implementing the processes and functions of the disclosure, the sections below provide details and examples of arrangements for non-collocated SCell selection for NR CA, which may be implemented by the network node 16, wireless device 22 and/or host computer 24.

Figure 13:
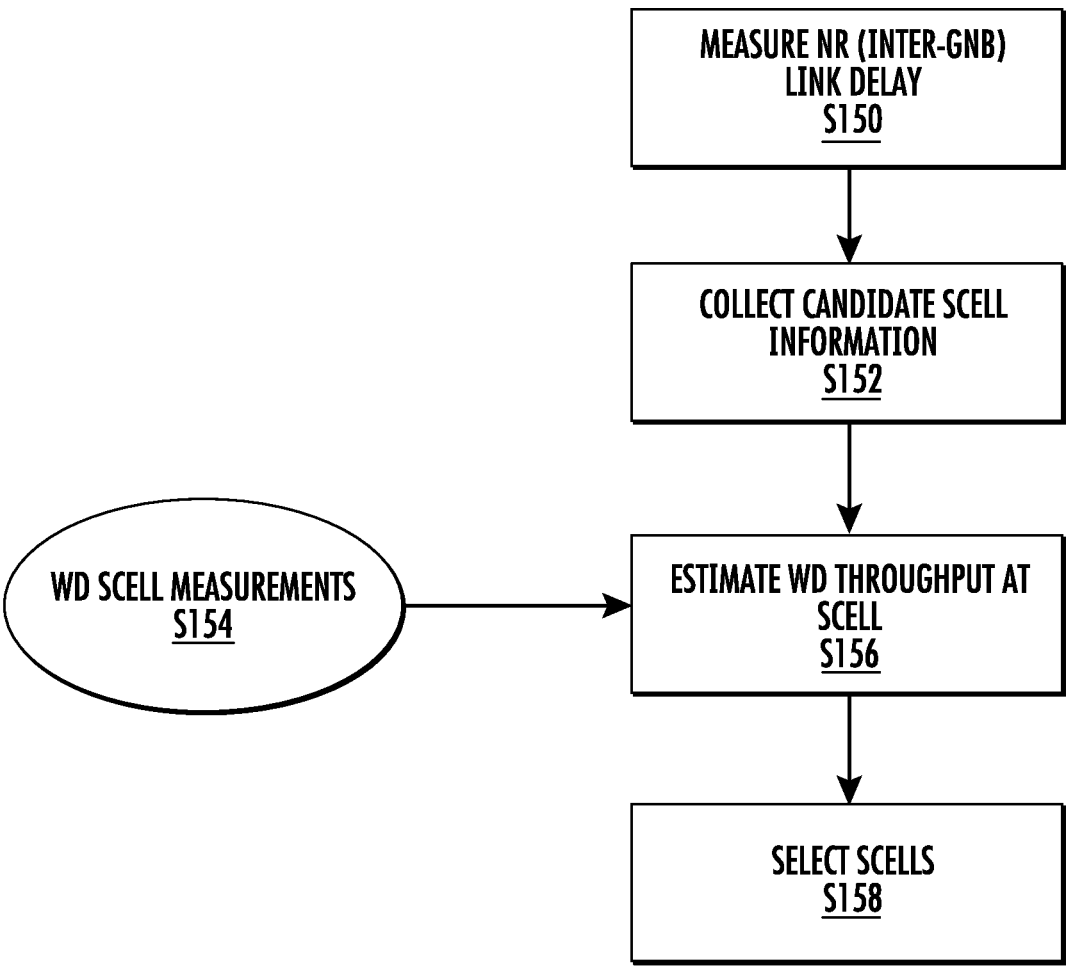
FIG. 13 is a flow chart of inter-gNB link aware SCell selection according to some embodiments of the present disclosure.

Some embodiments provide a proposed algorithm including one or more of the following steps, such as depicted in FIG. 13, which is a flow chart of inter-network node, e.g., inter-gNB link aware SCell selection according to some embodiments of the present disclosure.

SCell selection may be performed in several steps; one such approach is described below with reference to FIG. 13. Some embodiments propose new methods for an SCell selection process and for e.g., Step S156 in particular, and may be dependent on a measured or estimated inter-gNB delay value for each SCell's NN 16 being available at the SpCell's NN 16.

Step S150: Measure NR Inter-Network Node Delay

The SpCell's NN 16 determines the time taken to transmit packets (potential to carry the HARQ feedback of SCell data) between the SpCell's NN 16 and each of the SCell's NN 16.

Step S152: Collect Candidate SCell Information

The SpCell's NN 16 collects information about the candidate SCell(s) such as numerology, bandwidth, number of downlink (DL) HARQ processes, number of connected users (e.g., WDs 22) and the configured K1 value used by the SCell for allocating CA WDs 22 data. In step S154, WD Scell measurements may be obtained.

Step S156: Estimate WD Throughput at Candidate SCell

The SpCell's NN 16 combines or otherwise uses one or more of the measured channel information from the WD 22, the SCell information and the measured inter-network node delay to estimate the potential throughput at each SCell.

Step S158: Select SCells

The SpCell's NN 16 selects at least one Scell (e.g., a set of one or more Scells, the best SCells, etc.) for the WD 22 based on, for example, the estimated throughput (e.g., the estimated throughput from step S156 above, which is inter-node/inter-gNB delay based throughput).

The present disclosure describes at least four embodiments as follows:

1. Throughput estimate is based on different HARQ codebooks.
2. Throughput estimate is based on HARQ process reuse.
3. Feedback based SCell evaluation with machine learning.
4. Feedback and throughput based SCell selection.

Embodiment 1 outlines a calculation to estimate the throughput (e.g., the inter-node/inter-gNB based throughput) of the SCell candidate, where the throughput depends on which HARQ codebook that is used. Embodiment 2 reuses elements of Embodiment 1 but also enhances the estimate to, for example, consider the effects of other enhancements on SCells such as the existence of a HARQ process reuse algorithm, which may compensate for the impact of inter-node/inter-gNB delay on the HARQ processes availability.

Figure 14:
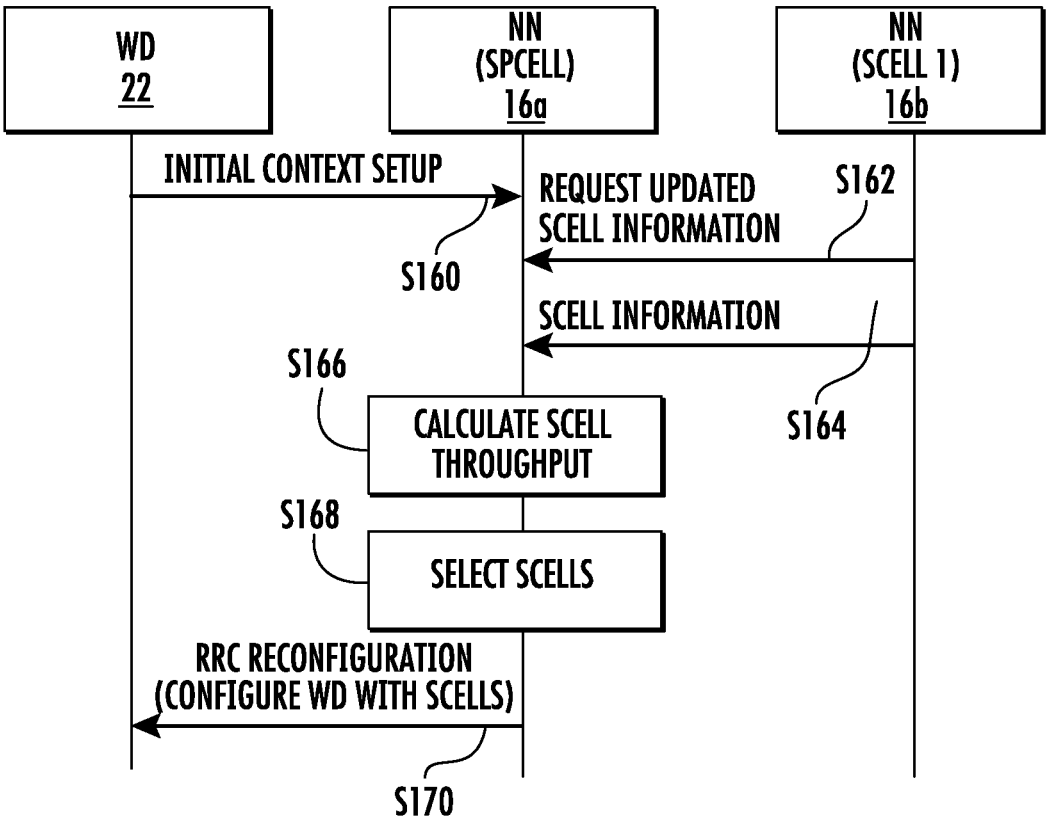
FIG. 14 illustrates an example of Embodiment 1 and 2 according to some embodiments of the present disclosure.

FIG. 14 is a flow chart illustrating an example process for embodiments 1 and 2. After an initial context setup in step S160, the SpCell's NN 16 requests SCell information in step S162. The SCell's NN 16 then provides the requested SCell information. In step S164, the throughput is calculated for the SCell. In some embodiments, steps S162 and/or S164 may be performed even before the initial context setup. For example, Scell information may be static such that an update may not be required when a new WD 22 access the SpCell and/or Scell. In step S166, the Scell throughput is calculated. In step S168 one or more SCells are selected by the SpCell's NN 16 e.g., based at least in part on the calculated/estimated throughput. In step S170, the SpCell's NN 16 configures the WD 22 with the selected SCell(s).

Figure 15:
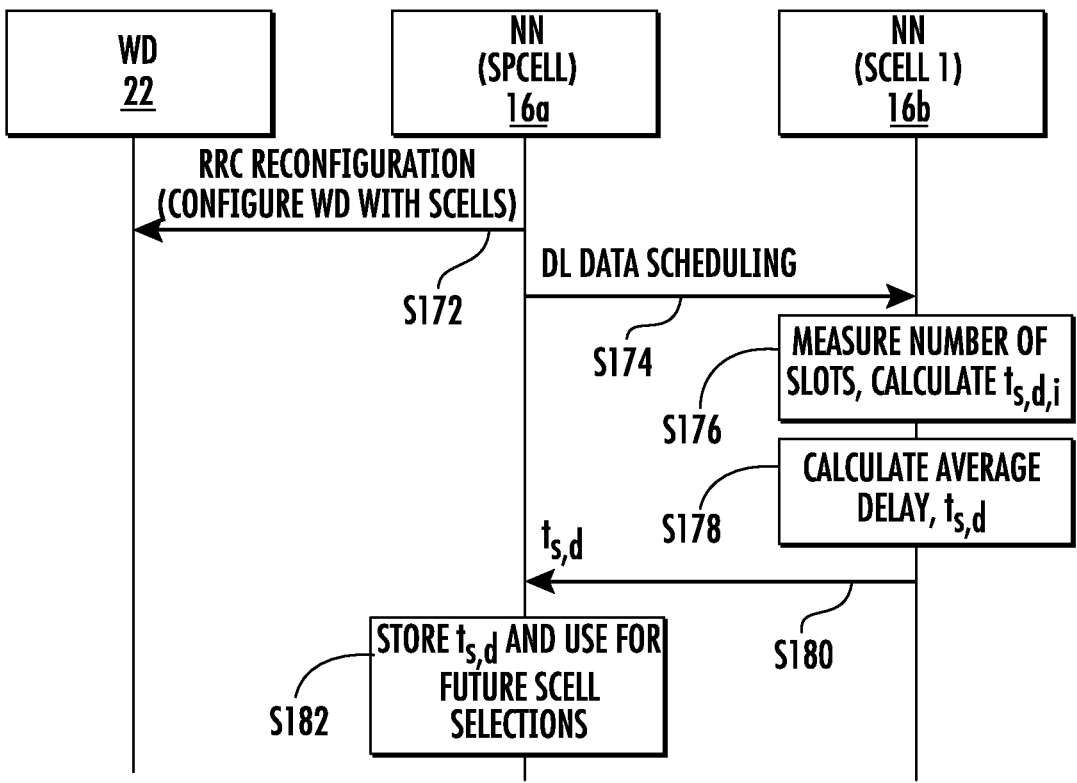
FIG. 15 illustrates an example of data collection in Embodiment 3 according to some embodiments of the present disclosure.

The third embodiment introduces a feedback-based approach where the number of slots in which the HARQ process exhaustion occurs is recorded and used to evaluate the SCells. FIG. 15 is a flow chart that illustrates an example process for the third embodiment. In step S172, the SpCell's NN 16 configures the WD 22 with the selected Scell(s). In step S174, the SpCell's NN 16 performs DL data scheduling. In step S176, the SCell's NN 16 measures the number of slots at which the WD 22 was not able to be scheduled on DL due to unavailable DL HARQ processes or other WDs 22 being scheduled. In step S178, the SCell's NN 16 calculates the average delay for all WDs 22 in a set served by SpCell's at the inter-gNB delay, d. In step S180, the average delay is reported to the SpCell's NN 16. In step S182, the SpCell's NN 16 stores the received average delay and may use it for future Scell selections. The third embodiment may also be used together with embodiments 1 and/or 2.

Embodiment 1

In this embodiment, all SCells candidates may be assumed to have the same bandwidth, radio conditions and load (achieved by an existing load balancing feature). Therefore, the WD 22 throughput estimation (e.g., see step S166) for each candidate SCell may be primarily a function of the inter-gNB link delay and the SCell numerology. This embodiment may include one or more of the following:

SpCell's NN 16 calculates the time between using the HARQ process (and/or HARQ process ID) by the SCell's NN 16 scheduler and reusing it for the same WD 22. The time is denoted by $t_{reuse}$ and computed as follows based on how the system is designed:

Assuming: Semi-static HARQ-ACK codebook is used:

$$t_{reuse} \text{ [ms]}=K1_{max} \text{ [ms]}+\text{inter-network node delay [ms]}+t_{proc} \text{ [ms]};$$

Where:

K1: is the time offset between the physical downlink shared channel (PDSCH) (via SCell) transmission to physical uplink control channel/physical uplink shared channel (PUCCH/PUSCH) (via SpCell) with the WD's 22 HARQ-ACK feedbacks.

K1 can be configured as a set of up to 8 different values, where $K1_{max}$ is the max K1 value applied on SCell's downlink (DL) transmissions.

inter-network node delay: is the one-way delay between SpCell's NN 16 and candidate SCell's NN 16.

$t_{proc}$: is the processing time consumed by physical layer.

SpCell's NN 16 estimates the amount of throughput degradations due to HARQ process exhaustion at the SCell denoted by L and computed as following:

$$L=\max(0,(t_{reuse}/t_{slot}*r_D-N_{HP})/(t_{reuse}/t_{slot}*r_D));$$

Where:

$t_{slot}$: duration of slot (transmission time interval/TTI) which depends on numerology (e.g., ⅛ ms for numerology 0).

$r_D$: ratio of DL slots to the total number of slots in the $t_{reuse}$ window (e.g., =0.75 if there are 15 DL slots and 5 uplink (UL) slots).

$N_{HP}$: maximum number of HARQ processes that can be used to transmit data to the same WD 22 from the same carrier (e.g., =16).

The throughput of user i (e.g., $WD_i$ 22) connected on the SCell candidate s is denoted by $R_{i,s}$ and can thus be updated to reflect both the contention with other users (e.g., WDs 22) and the HARQ process exhaustion as follows:

$$R_{i,s}=\min(R_N,R_H);$$

Where:

$R_N$ is the achieved user/WD 22 throughput at the SCell assuming for instance fair sharing of resource with N users/WDs 22 (local users or CA users using this cell as the SCell) statistically with DL data to transmit (e.g., 30% of connected users/WDs 22), and it can be simplified as, for example:

$R_N$=Transport Block Size (bits)×numberOfDLTtisPersubframe*(1/N), where numberOfDLTtisPersubframe may be computed according to the SCell numerology;

$R_H$ is the calculated throughput after accounting for the HARQ process exhaustion loss computed in the previous step, and can be simplified as, for example:

$R_H$=Transport Block Size (bits)×numberOfDLTtisPersubframe×(1−L).

The SpCell's NN 16 may repeat the above steps for each candidate SCell and selects the SCell with the maximum $R_{i,s}$, or uses the estimated $R_{i,s}$ values to select the best set of SCells for the WD 22.

Embodiment 2

In this embodiment, SCells have different numerologies and the network may be adopting some optimization techniques to reuse the HARQ processes after the WD 22 has transmitted the feedback (SCell's NN 16 has not received the HARQ data yet).

The SCell throughput loss in Embodiment 1 may be reused; however, the value of $N_{HP}$ may be updated to reflect the amount of internal HARQ processes that can be reused. Such information may be provided by the SCell's NN 16 to the SpCell's NN 16.

Embodiment 3: Feedback Based SCell Evaluation

In this embodiment, each SCell's NN 16 may provide a feedback to the SpCell's NN 16 on the average number of slots at which the current or previously connected WDs 22 have experienced HARQ process exhaustion.

At SCell s:

For each served CA WD 22 connected to (currently or previously connected to) the SpCell's NN 16 with link delay d:

SCell's NN 16 measures and stores the number of slots at which this WD 22 was not able to be scheduled on DL due to unavailable DL HARQ processes (e.g., unavailable DL HARQ process IDs e.g., due to delayed feedback over a long inter-gNB link) or other WDs 22 being scheduled→$t_{s,d,i}$ End For;

SCell's NN 16 computes the average for all WDs 22 (in set I) served by the SpCell's NN 16 (with the same inter-gNB delay d from the current $$SCell\ d \to t_{s,d} = \frac{1}{|I|} \sum_i t_{s,d,i} \forall\ d;$$

SCell's NN 16 reports $t_{s,d}$ to each SpCell's NN 16 with delay d.

The SpCell's NN 16 may record $t_{s,d}$ and store it locally for that SCell, and thus can be used for future SCell evaluation.

Figure 16:
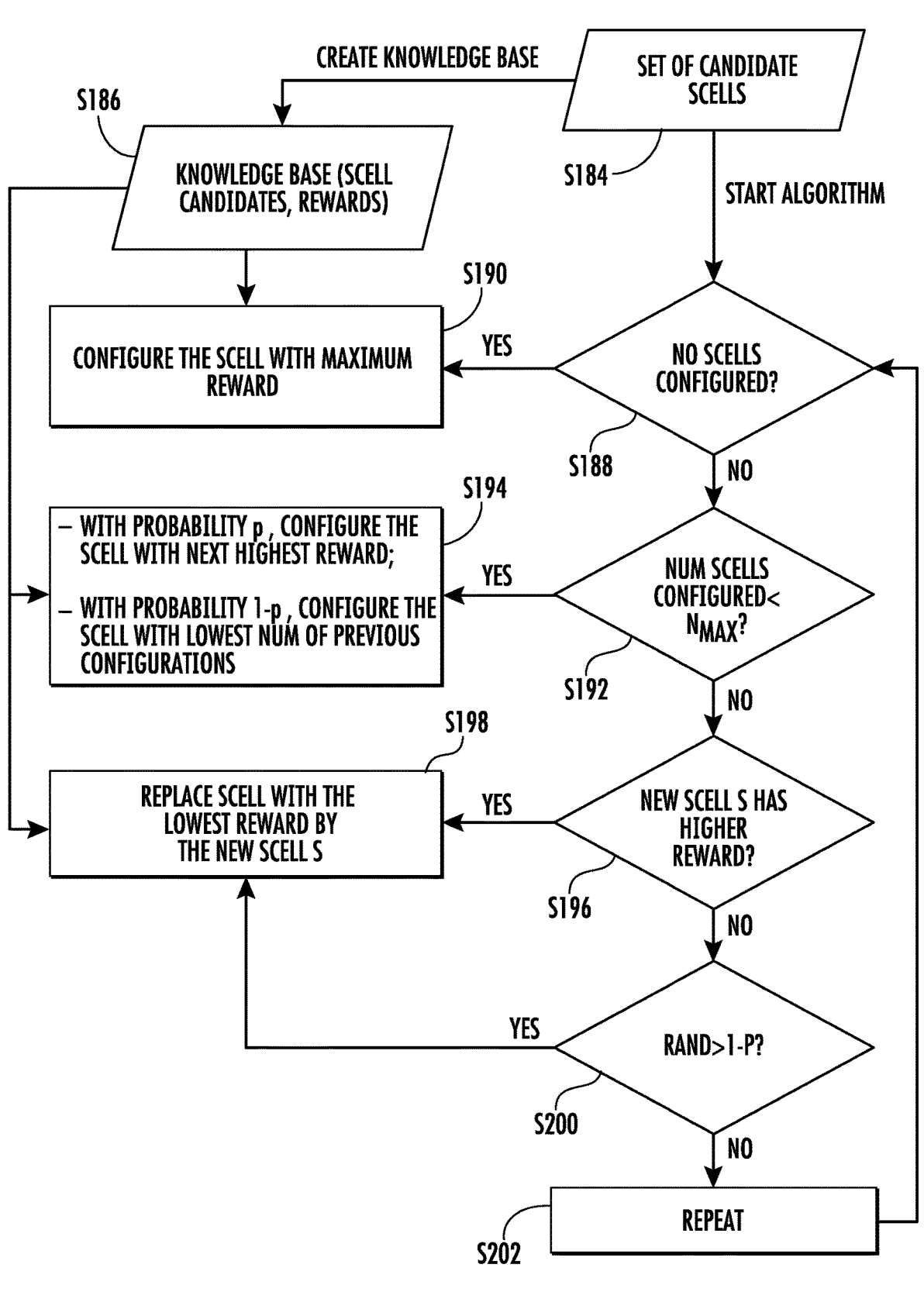
FIG. 16 is a flow chart of an example of Embodiment 3 according to some embodiments of the present disclosure.

In some embodiments, SCell selection may involve machine learning techniques such as reinforcement learning where the SpCell's NN 16, during the initial phase of deployment, attempts to configure and activate multiple SCells with different inter-network node delays and uses the measured delay by the SCell's NN 16 as a negative reward. The set of actions may be different permutations of configured/de-configured candidate SCells. This may be summarized in the following steps, with reference to FIG. 16, which may be performed at the SpCell's NN 16:

Step S184:

Define states as set S of configured SCells:

No SCell configured. S={•}.

1 SCell configured. S={{$s_1$}, {$s_2$}, {$s_3$}, . . . {$s_n$}}.

N SCell configured. S={{$s_1,s_2$}, {$s_1,s_3$}, {$s_1,s_4$}, . . . {$s_{n-1},s_n$}}.

$N_{max}$ SCells configured. S={{$s_1,s_2,s_3,s_4$}, . . . , {$s_{n-3}$, $s_{n-2}$, $s_{n-1}$, $s_n$}}, if $N_{max}$ is assumed to be 4.

Define actions as:

Configure SCell s; and/or

De-configure SCell s.

Define reward as a function of $t_{s,d}$ or the achieved inter-network node delay based throughput.

Step S186:

Store the reward for each SCell s in a knowledge base (e.g., Q-table). SCells that have never been evaluated may have a very low reward (e.g., −1).

SCells' NNs 16 continuously revaluates their delay and sends it back to the SpCell's NN 16 which updates the knowledge base. FIG. 17 illustrates an example of the knowledge base, in a table format.

Steps S188-S202:

IF no SCells are configured (S188):

Select and configure the SCell with the MAXIMUM reward (S190);

IF the WD 22 already has one SCell configured (S192):

Explore the other SCells by applying the following (S194):

With probability p, configure the SCell with the next highest reward;

With probability 1-p, configure the SCell which was configured the least number of times (i.e., probably due to its low reward);

IF the WD 22 has configured the maximum number of SCells:

IF one of the not configured SCell s has an updated reward (reward is reported due to the SCell configured for other SpCells with the same inter-network node delay as the SpCell that is currently running the SCell selection algorithm);

IF the reward of SCell s>lowest reward among configured SCells (S196):

then the SpCell's NN 16 can deconfigure the SCell that has the lowest reward, and configure SCell s (S198);

ELSE

Otherwise, keep the current configured SCells or replace the SCell that has the lowest reward with a probability 1-p (i.e. apply exploration), in step S200;

ELSE

In step S202, repeat from step 2.

Embodiment 4

In some embodiments, the computed inter-network node throughput or scheduling delay in embodiments 1, 2 and 3, may be used as an input criterion to any other existing SCell selection algorithm.

One option is to use the prediction as-is, so that Tp (the predicted throughput based on the inter-network node latency) replaces Tc (the calculated throughput of the carrier without consideration of the inter-network node latency which may be used in an existing SCell Selection algorithm) as the weight for the SCell candidates. The preferred option is to instead use the factor, Id (Impact of delay, where Id=Tp/Tc). This may make it possible to perform further operations on Id, for example such as limiting the factor to a reasonable range (there may be a risk that the algorithm predicts outliers that, based on e.g., domain-knowledge, may be known how to exclude), and possibly averaging it based on predictions for other WDs 22 in the same cell. After this post-processing, Tc may be multiplied by Id in order to obtain a better estimate for the DL throughput.

The algorithms executed by SpCell's NN 16 and SCell's NN 16 in embodiment 1-4 may be executed in a cloud environment, outside the wireless node serving the WDs 22 by means of carrier aggregation.

Some embodiments of the present disclosure may provide for one or more of the following:

1. Improved selection of SCells that are non-collocated with the SpCell's NN 16 as a function of one or more of:
   a. Inter-network node link delay;
   b. Configured HARQ-ACK parameters;
   c. SCell numerology; and
   d. Capability to reuse HARQ processes.
2. Allow SpCell's NN 16 to estimate a user (WD 22) throughput based on one or more or all the above factors (1.a-1.d), which may be combined with other SCell selection criteria to provide a further enhanced decision.
3. Allow non-collocated SCells' NNs 16 to estimate and store the user experience due to long inter-network node delay and report that to the SpCell's NN 16, where the latter may improve future decisions (e.g., non-collocated SCell selection) by e.g., machine learning.

Some embodiments may include one or more of the following:

Embodiment A1. A network node configured to communicate with a wireless device (WD), the network node configured to, and/or comprising a radio interface and/or comprising processing circuitry configured to:
   estimate a throughput for the WD at a candidate secondary cell, the estimated throughput based at least in part on a measured inter-network node delay between the network node and another network node, the network node supporting a special cell and the another network node supporting the candidate secondary cell; and
   determine whether to select the candidate secondary cell for the WD based at least in part on the estimated throughput.

Embodiment A2. The network node of Embodiment A1, wherein one or more of:
   the candidate secondary cell is non-collocated with the special cell; and
   the estimated throughput is based at least in part on at least one of:
      a Hybrid Automatic Repeat reQuest (HARQ) codebook used for the candidate secondary cell;
      an amount of HARQ process reuse used for the candidate secondary cell;
      feedback from the candidate secondary cell, the feedback indicating an amount of time resources associated with HARQ process exhaustion for an inter-network node delay, d;
      a numerology used by the secondary cell; and
      a machine learning algorithm.

Embodiment A3. The network node of Embodiment A1, wherein the network node and/or the radio interface and/or the processing circuitry is further configured to cause the network node to:
   measure the inter-network node delay between the network node and another network node.

Embodiment B1. A method implemented in a network node, the method comprising:
   estimating a throughput for the WD at a candidate secondary cell, the estimated throughput based at least in part on a measured inter-network node delay between the network node and another network node, the network node supporting a special cell and the another network node supporting the candidate secondary cell; and

determining whether to select the candidate secondary cell for the WD based at least in part on the estimated throughput.

Embodiment B2. The method of Embodiment B1, wherein one or more of:
   the candidate secondary cell is non-collocated with the special cell; and
   the estimated throughput is based at least in part on at least one of:
      a Hybrid Automatic Repeat reQuest (HARQ) codebook used for the candidate secondary cell;
      an amount of HARQ process reuse used for the candidate secondary cell;
      feedback from the candidate secondary cell, the feedback indicating an amount of time resources associated with HARQ process exhaustion for an inter-network node delay, d;
      a numerology used by the secondary cell; and
      a machine learning algorithm.

Embodiment B3. The method of Embodiment B1, further comprising:
   measuring the inter-network node delay between the network node and another network node.

Embodiment C1. A network node configured to communicate with a wireless device (WD), the network node configured to, and/or comprising a radio interface and/or comprising processing circuitry configured to:
   determine a time duration associated with Hybrid Automatic Repeat reQuest (HARQ) process exhaustion at an inter-network node delay; and
   report the time duration to another network node, the another network node supporting a special cell and the network node supporting a candidate secondary cell.

Embodiment C2. The WD of Embodiment C1, wherein one or more of:
   the time duration is based at least in part on a number of slots at which this WD was not able to be scheduled due to at least one of: unavailability of HARQ processes and other WDs being scheduled;
   the candidate secondary cell is non-collocated with the special cell; and
   the candidate secondary cell being selected for carrier aggregation for the WD based at least in part on an estimated WD throughput, the estimated WD throughput being based at least in part on the reported amount.

Embodiment D1. A method implemented in a network node, the method comprising:
   determining a time duration associated with Hybrid Automatic Repeat reQuest (HARQ) process exhaustion at an inter-network node delay; and
   reporting the time duration to another network node, the another network node supporting a special cell and the network node supporting a candidate secondary cell.

Embodiment D2. The method of Embodiment D1, wherein one or more of:
   the time duration is based at least in part on a number of slots at which this WD was not able to be scheduled due to at least one of: unavailability of HARQ processes and other WDs being scheduled;
   the candidate secondary cell is non-collocated with the special cell; and
   the candidate secondary cell being selected for carrier aggregation for the WD based at least in part on an estimated WD throughput, the estimated WD throughput being based at least in part on the reported amount.

As may be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It may be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It may be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
|---|---|
| NR | New Radio |
| CA | Carrier Aggregation |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a network node configured to communicate with a wireless device, WD, the method comprising:

estimating a first throughput for the WD at a first candidate secondary cell, the estimated first throughput being based at least in part on a measured inter-network node delay between the network node and a first network node supporting the first candidate secondary cell, the network node supporting a primary cell;

determining an amount of Hybrid Automatic Repeat reQuest, HARQ, process reuse associated with the first candidate secondary cell for the WD, the estimated throughput based further on the determined amount of HARQ process reuse; and determining whether to select the first candidate secondary cell for the WD based at least in part on the first estimated throughput.

2. The method of claim 1, further comprising:

estimating an amount of a throughput degradation associated with a HARQ process exhaustion at the first candidate secondary cell for the WD, the first estimated throughput being further based on the estimated amount of the throughput degradation.

3. The method of claim 2, wherein the estimating the first throughput for the WD further comprises assuming a same bandwidth, a same radio condition and a same load for the first candidate secondary cell and a second candidate secondary cell on which a second throughput for the WD is estimated.

4. The method of claim 2, wherein:

the estimated amount of the throughput degradation associated with the HARQ process exhaustion at the first candidate secondary cell for the WD is based on a configuration received from the first network node, the information indicating a maximum number of HARQ processes associated with the first candidate secondary cell for the WD; and wherein the estimating the first throughput for the WD further comprises assuming different numerologies for the first candidate secondary cell and a second candidate secondary cell on which a second throughput for the WD is estimated.

5. The method of claim 1, further comprising:

receiving feedback from the first network node supporting the first candidate secondary cell, the feedback indicating an average amount of time resources associated with a Hybrid Automatic Repeat reQuest, HARQ, process exhaustion experienced by WDs connected to the first candidate secondary cell and primary cells with an inter-network node delay, d, and the determining whether to select the first candidate secondary cell for the WD being based further on the received feedback.

6. The method of claim 5, further comprising:

using a machine learning model comprising feedback from network nodes supporting candidate secondary cells as an input; and configuring, de-configuring and activating a plurality of candidate secondary cells having different inter-network node delays according to the machine learning model, and the determining whether to select the first candidate secondary cell for the WD being based further on an output of the machine learning model.

7. The method of claim 1, further comprising:

estimating multiple throughputs for the WD at multiple candidate secondary cells, the multiple estimated throughputs being based at least in part on a measured inter-network node delay between the network node and multiple network nodes supporting the multiple candidate secondary cells;

selecting at least one of the multiple candidate secondary cells for the WD based on a comparison between the multiple estimated throughputs; and configuring the WD with the selected at least one of the multiple candidate secondary cells.

8. The method of claim 7, further comprising:

using a predicted throughput, Tp, based on inter-network node delay as an input to selecting the at least one of the multiple candidate secondary cells.

9. The method of claim 7, further comprising:

using a machine learning model to select the at least one of the multiple candidate secondary cells for the WD, the machine learning model comprising, as an input, at least one of:

the measured inter-network node delay;

an amount of Hybrid Automatic Repeat reQuest, HARQ, process reuse;

an estimated amount of a throughput degradation associated with a HARQ process exhaustion; and a feedback indicating an average amount of time resources associated with the HARQ process exhaustion for an inter-network node delay, d.

10. A network node configured to communicate with a wireless device, WD, the network node comprising processing circuitry, the processing circuitry configured to:

estimate a first throughput for the WD at a first candidate secondary cell, the estimated first throughput being based at least in part on a measured inter-network node delay between the network node and a first network node supporting the first candidate secondary cell, the network node supporting a primary cell;

determine an amount of Hybrid Automatic Repeat reQuest, HARQ, process reuse associated with the first candidate secondary cell for the WD, the estimated throughput based further on the determined amount of HARQ process reuse; and determine whether to select the first candidate secondary cell for the WD based at least in part on the first estimated throughput.

11. The network node of claim 10, wherein the processing circuitry is further configured to:

estimate an amount of a throughput degradation associated with a HARQ process exhaustion at the first candidate secondary cell for the WD, the first estimated throughput being further based on the estimated amount of the throughput degradation.

12. The network node of claim 11, wherein the processing circuitry is configured to estimate the first throughput for the WD by being configured to:

assume a same bandwidth, a same radio condition and a same load for the first candidate secondary cell and a second candidate secondary cell on which a second throughput for the WD is estimated.

13. The network node of claim 11, wherein:

the estimated amount of the throughput degradation associated with the 8HARQ process exhaustion at the first candidate secondary cell for the WD is based on configuration received from the first network node, the information indicating a maximum number of HARQ processes associated with the first candidate secondary cell for the WD; and the processing circuitry is configured to estimate the first throughput for the WD by being configured to assume different numerologies for the first candidate secondary cell and a second candidate secondary cell on which a second throughput for the WD is estimated.

14. The network node of claim 10, wherein the processing circuitry is further configured to:

receive feedback from the first network node supporting the first candidate secondary cell, the feedback indicating an average amount of time resources associated with HARQ process exhaustion experienced by WDs connected to the first candidate secondary cell and primary cells with an inter-network node delay, d, and the determination of whether to select the first candidate secondary cell for the WD is based further on the received feedback.

15. The network node of claim 14, wherein the processing circuitry is further configured to:

use a machine learning model comprising feedback from network nodes supporting candidate secondary cells as an input; and configure, de-configure and activate a plurality of candidate secondary cells having different inter-network node delays according to the machine learning model, and the determination of whether to select the first candidate secondary cell for the WD is based further on an output of the machine learning model.

16. The network node of claim 10, wherein the processing circuitry is further configured to:

estimate multiple throughputs for the WD at multiple candidate secondary cells, the multiple estimated throughputs being based at least in part on a measured inter-network node delay between the network node and multiple network nodes supporting the multiple candidate secondary cells;

select at least one of the multiple candidate secondary cells for the WD based on a comparison between the multiple estimated throughputs; and configure the WD with the selected at least one of the multiple candidate secondary cells.

17. The network node of claim 16, wherein the processing circuitry is further configured to:

use a predicted throughput, Tp, based on inter-network node delay as an input to selecting the at least one of the multiple candidate secondary cells.

18. The network node of claim 16, wherein the processing circuitry is further configured to:

use a machine learning model to select the at least one of the multiple candidate secondary cells for the WD, the machine learning model comprising, as an input, at least one of:

the measured inter-network node delay;

an amount of Hybrid Automatic Repeat reQuest, HARQ, process reuse;

an estimated amount of a throughput degradation associated with a HARQ process exhaustion; and a feedback indicating an average amount of time resources associated with the HARQ process exhaustion for an inter-network node delay, d.

\* \* \* \* \*